(12) United States Patent
Guo

(10) Patent No.: US 12,518,836 B2
(45) Date of Patent: Jan. 6, 2026

(54) MEMORY DEVICE HAVING MULTIPLE SUBBLOCKS, OPERATING METHOD THEREOF, AND MEMORY SYSTEM

(71) Applicant: Yangtze Memory Technologies Co., Ltd., Hubei (CN)

(72) Inventor: Xiaojiang Guo, Hubei (CN)

(73) Assignee: Yangtze Memory Technologies Co., Ltd., Wuhan (CN)

( * ) Notice: Subject to any disclaimer, the term of this patent is extended or adjusted under 35 U.S.C. 154(b) by 192 days.

(21) Appl. No.: 18/153,843

(22) Filed: Jan. 12, 2023

(65) Prior Publication Data

US 2024/0112741 A1    Apr. 4, 2024

Related U.S. Application Data

(63) Continuation of application No. PCT/CN2022/136531, filed on Dec. 5, 2022.

(30) Foreign Application Priority Data

Sep. 29, 2022    (CN) .......................... 202211204616.1

(51) Int. Cl.
G11C 16/28    (2006.01)
G11C 16/10    (2006.01)
G11C 16/14    (2006.01)

(52) U.S. Cl.
CPC ............ G11C 16/28 (2013.01); G11C 16/102 (2013.01); G11C 16/14 (2013.01)

(58) Field of Classification Search
CPC ....... G11C 16/28; G11C 16/102; G11C 16/14; G11C 16/08; G11C 16/10; G11C 16/16; G11C 16/3495; G11C 16/0483
See application file for complete search history.

(56) References Cited

U.S. PATENT DOCUMENTS 9,620,201 B1    4/2017 Lai et al.
10,734,079 B1    8/2020 Seethamman et al.
(Continued)

FOREIGN PATENT DOCUMENTS

KR    10-2020-0140181 A    12/2020
KR    10-2021-0120778 A    10/2021

OTHER PUBLICATIONS

Korean Office Action issued on Jan. 16, 2025 in the Korean Patent Application No. 10-2024-7028405 with English Translation citing references 15 and 16 therein, 13 pages.

(Continued)

*Primary Examiner* — Sultana Begum
(74) *Attorney, Agent, or Firm* — Oblon, McClelland, Maier & Neustadt, L.L.P.

(57) ABSTRACT

A memory device includes at least one memory cell array block and a control logic. The memory cell array block includes multiple layers of memory cells and word line layers provided corresponding to individual layers of memory cells. The memory cell array block is divided into at least two memory cell array subblocks, each subblock comprising a number of layers of memory cells and word line layers provided corresponding to individual layers of memory cells. The control logic is coupled to the memory cell array block, and configured to: erase, read or program the memory cell array block using a block mode or a subblock mode, and when the memory cell array block is erased, read, or programmed under the subblock mode, determine, at least based on a state of one of the two memory cell array subblocks, an operation strategy of the other memory cell array subblock.

20 Claims, 7 Drawing Sheets

(56) References Cited

U.S. PATENT DOCUMENTS

2017/0133087 A1\* 5/2017 Park .................. G11C 16/10
2023/0069260 A1\* 3/2023 Lien .................. G11C 16/10
2023/0345228 A1\* 10/2023 Barry ................. H04W 8/183

OTHER PUBLICATIONS

Office Action dated Jul. 24, 2025, issued in Chinese application No. 202211204616.1, with computer-generated English translation.
Office Action dated Jul. 22, 2025, issued in Korean application No. 10-2024-7028405, with computer-generated English translation.
Extended European Search Report dated Sep. 9, 2025, issued in European application No. 22960628.0.

\* cited by examiner

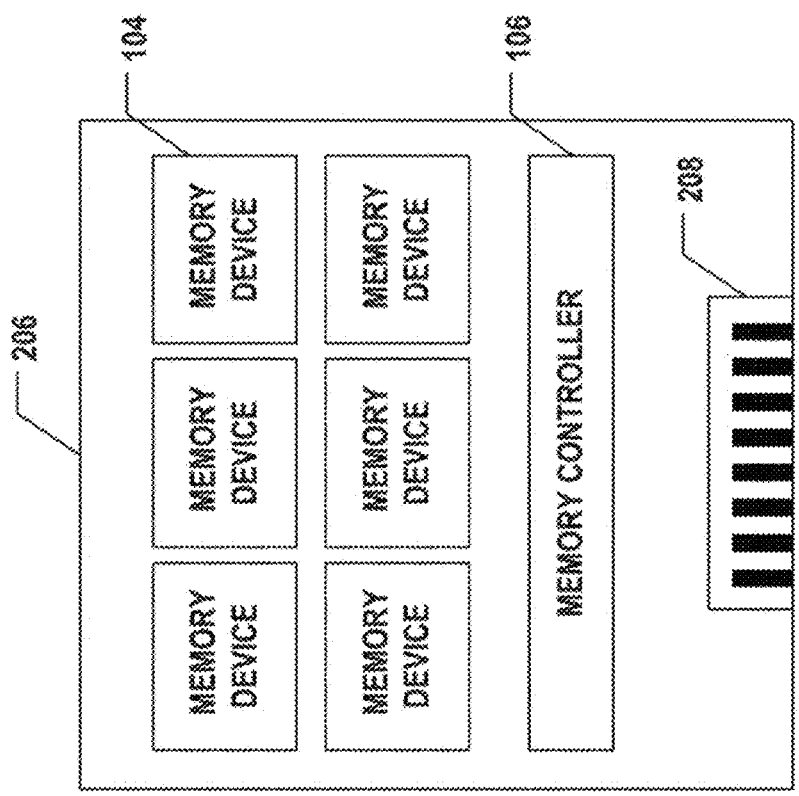

MEMORY DEVICE HAVING MULTIPLE SUBBLOCKS, OPERATING METHOD THEREOF, AND MEMORY SYSTEM

CROSS REFERENCE TO RELATED APPLICATION

The present application is a bypass continuation application of International Application No. PCT/CN2022/136531, filed on Dec. 5, 2022, which claims priority to Chinese Patent Application No. 2022112046161, "Memory device, operating method thereof, and memory system", filed on Sep. 29, 2022. The entire disclosures of both applications are hereby incorporated by reference in their entirety.

TECHNICAL FIELD

The present disclosure relates to semiconductor technology. In particular, this disclosure relates to a memory device, an operating method thereof, and a memory system.

BACKGROUND

With the continuous development of 3D NAND memory technology, the number of layers in the stacked structure of a 3D NAND memory has been increasing, from 24 to 48, 96, 128, 176, and even more, thus increasing the capacity of individual memory cell array blocks in the memory device. However, in the context of high layer number becoming the current mainstream, there is still a demand for memory cell array blocks with a small capacity. Therefore, it is needed to provide a memory device and an operating method thereof that can accommodate the demand for small capacity memory cell array blocks with as little firmware update as possible.

SUMMARY

To solve one or more of the existing technical problems, embodiments of the present disclosure propose a memory device, an operating method thereof, and a memory system.

Embodiments of the present disclosure provide a memory device comprising at least one memory cell array block and a control logic, wherein the memory cell array block comprises multiple layers of memory cells and word line layers provided corresponding to individual layers of memory cells; the memory cell array block is divided into at least two memory cell array subblocks, each memory cell array subblock comprising a number of layers of memory cells and word line layers provided corresponding to individual layers of memory cells; the control logic is coupled to the memory cell array block, and configured to: erase, read or program the memory cell array block using a block mode or a subblock mode; and when the memory cell array block is erased, read, or programmed under the subblock mode, determine, at least based on a state of one of the two memory cell array subblocks, an operation strategy of the other memory cell array subblock.

In the above aspect, the memory cell array block comprises at least: a first memory cell array subblock provided close to a semiconductor layer, and a second memory cell array subblock provided on the first memory cell array subblock.

In the above aspect, the first memory cell array subblock comprises a first number of word line layers, and the second memory cell array subblock comprises a second number of word line layers, wherein the first number is the same as or different from the second number.

In the above aspect, the memory cell array block further comprises: at least one dummy memory cell layer provided between the first memory cell array subblock and the second memory cell array subblock, and corresponding at least one dummy word line layer.

In the above aspect, the control logic is configured to use, with respect to both the first memory cell array subblock and the second memory cell array subblock, a same programming sequence as that used when the block mode is adopted to perform a write programming operation to the memory cell array block.

In the above aspect, the control logic is configured such that, with respect to both the first memory cell array subblock and the second memory cell array subblock, programming is performed using a reverse programming sequence, wherein the first memory cell array subblock is programmed sequentially from a memory cell layer closest to the at least one dummy memory cell layer to a memory cell layer closest to a bottom selection grid, and the second memory cell array subblock is programmed sequentially from a memory cell layer closest to a top selection grid to a memory cell layer closest to the at least one dummy memory cell layer.

In the above aspect, the control logic is configured to determine, based on a state of one of the two memory cell array subblocks together with a relative position relationship between the two memory cell array subblocks, an operation strategy of the other memory cell array subblock.

In the above aspect, the control logic is configured to determine, when the first memory cell array subblock is in an erased state, that the second memory cell array subblock is capable of being used to perform a programming operation and an erasing operation.

In the above aspect, the control logic is configured to determine, when the first memory cell array subblock is in a programmed state, that the second memory cell array subblock is capable of being used to perform an erasing operation and is not capable of being used to perform a programming operation.

In the above aspect, the control logic is configured to determine, when the second memory cell array subblock is in an erased state or a programmed state, that the first memory cell array subblock is capable of being used to perform a programming operation and an erasing operation.

In the above aspect, the control logic is configured to perform, when the first memory cell array subblock is in a programmed state and needs an erasing operation while the second memory cell array subblock is in a programmed state, an erasing operation on the first memory cell array subblock.

In the above aspect, the control logic is configured to perform, when the first memory cell array subblock is in a programmed state and needs an erasing operation while data stored in the second memory cell array subblock is obsolete, an erasing operation on both the first memory cell array subblock and the second memory cell array subblock.

In the above aspect, the control logic is configured such that, when the second memory cell array subblock is in a programmed state, a programming/erasing cycle count of the first memory cell array subblock is less than or equal to a first preset value.

In the above aspect, the control logic is configured to prohibit, when the programming/erasing cycle count of the first memory cell array subblock is greater than the first preset value, the programming/erasing operation on the first memory cell array subblock, until the data stored in the second memory cell array subblock is erased.

In the above aspect, the control logic is configured to perform, when the programming/erasing cycle count of the first memory cell array subblock is greater than the first preset value, an erasing operation and a programming operation on the data stored in the second memory cell array subblock, and subsequently the first memory cell array subblock is capable of being used to perform a programming operation and an erasing operation.

In the above aspect, the first preset value is in a range of 10-100.

In the above aspect, the control logic is configured to process the first memory cell array subblock and the second memory cell array subblock using a wear leveling algorithm, such that a difference between a programming/erasing cycle count of the first memory cell array subblock and a programming/erasing cycle count of the second memory cell array subblock is less than a second preset value.

In the above aspect, the control logic is configured to: when using the subblock mode to perform a reading operation on the memory cell array block, determine, based on a state of each of the two memory cell array subblocks, a voltage control strategy to be used when the reading operation is performed on a memory cell array subblock in the programmed state among the two memory cell array subblocks.

In the above aspect, the control logic is configured such that, when using the subblock mode to perform a reading operation on the memory cell array block, and the memory cell array subblock on which the reading operation is to be performed is in a programmed state, if the other memory cell array subblock is in an erased state, a first reading voltage is applied to a selected word line layer in the memory cell array subblock on which the reading operation is to be performed, and if the other memory cell array subblock is in a programmed state, a second reading voltage is applied to a selected word line layer in the memory cell array subblock on which the reading operation is to be performed, the first reading voltage being less than the second reading voltage.

In the above aspect, the first reading voltage and the second reading voltage are obtained by superposition of a reference reading voltage and a compensation voltage.

In the above aspect, the control logic is configured to: store a reading voltage offset marker of the memory cell array block as a first state when the other memory cell array subblock is in an erased state, the first state representing that the compensation voltage is less than zero, and store the reading voltage offset marker of the memory cell array block as a second state when the other memory cell array subblock is in a programmed state, the second state representing that the compensation voltage is zero.

In the above aspect, the memory device further comprises a register provided corresponding to the memory cell array block, the register being configured to store the reading voltage offset marker corresponding to the memory cell array block, and the control logic is configured to update a state of the register when a programmed state of any memory cell array subblock of the memory cell array block changes.

Embodiments of the present disclosure further provide a memory system comprising: one or more memory devices as described in the preceding embodiments; and a memory controller that is coupled to and controls the one or more memory device.

In the above aspect, with respect to each memory device, a corresponding control logic in each memory device is configured to send, when a corresponding operation is performed on any memory cell array subblock in a corresponding memory, a state of the memory cell array subblock to the memory controller.

The memory controller is configured to store a state of any memory cell array subblock in each memory device, and send, before a corresponding control logic uses a subblock mode to perform a reading operation on a memory cell array block of the memory device, states of all subblocks included in the memory cell array block to the corresponding control logic.

Embodiments of the present disclosure further provide a method of operating a memory device, the memory device comprising at least one memory cell array block and a control logic, wherein the memory cell array block comprises multiple layers of memory cells and word line layers provided corresponding to individual layers of memory cells, and the memory cell array block is divided into at least two memory cell array subblocks, each memory cell array subblock comprising a number of layers of memory cells and word line layers provided corresponding to individual layers of memory cells.

The method comprises using a block mode or a subblock mode to perform an erasing, reading, or programming operation on the memory cell array block, and when using the subblock mode to perform the erasing, reading, or programming operation on the memory cell array block, determining, at least based on a state of one of the two memory cell array subblocks, an operation strategy of the other memory cell array subblock.

In the above aspect, the memory cell array block comprises at least: a first memory cell array subblock provided close to a semiconductor layer, and a second memory cell array subblock provided on the first memory cell array subblock.

In the above aspect, the memory cell array block further comprises: at least one dummy memory cell layer provided between the first memory cell array subblock and the second memory cell array subblock, and corresponding at least one dummy word line layer.

In the above aspect, the method further comprises using, with respect to both the first memory cell array subblock and the second memory cell array subblock, a same programming sequence as that used when a block mode is used to perform a write programming operation on the memory cell array block.

In the above aspect, said using, with respect to both the first memory cell array subblock and the second memory cell array subblock, a same programming sequence as that used when the block mode is adopted to perform a write programming operation on the memory cell array block comprises: using a reverse programming sequence to program both the first memory cell array subblock and the second memory cell array subblock, wherein the first memory cell array subblock is programmed sequentially from a memory cell layer closest to the dummy memory cell layers to a memory cell layer closest to a bottom selection grid, and the second memory cell array subblock is programmed sequentially from a memory cell layer closest to a top selection grid to a memory cell layer closest to the dummy memory cell layers.

In the above aspect, said determining, at least based on a state of one of the two memory cell array subblocks, an operation strategy of the other memory cell array subblock comprises: determining, based on a state of one of the two memory cell array subblocks together with a relative position relationship between the two memory cell array subblocks, an operation strategy of the other memory cell array subblock.

In the above aspect, said determining, based on a state of one of the two memory cell array subblocks together with a relative position relationship between the two memory cell array subblocks, an operation strategy of the other memory cell array subblock, comprises: determining, when a first memory cell array subblock is in an erased state, that a second memory cell array subblock is capable of being used to perform a programming operation and an erasing operation.

In the above aspect, said determining, based on a state of one of the two memory cell array subblocks together with a relative position relationship between the two memory cell array subblocks, an operation strategy of the other memory cell array subblock, comprises: determining, when the first memory cell array subblock is in a programmed state, that the second memory cell array subblock is capable of being used to perform an erasing operation and is not capable of being used to perform a programming operation.

In the above aspect, said determining, based on a state of one of the two memory cell array subblocks together with a relative position relationship between the two memory cell array subblocks, an operation strategy of the other memory cell array subblock, comprises: determining, when the second memory cell array subblock is in an erased state or a programmed state, that the first memory cell array subblock is capable of being used to perform both a programming operation and an erasing operation.

The method of the above aspect further comprises: when the first memory cell array subblock is in a programmed state and needs an erasing operation, while the second memory cell array subblock is in a programmed state, performing an erasing operation on the first memory cell array subblock.

In the above aspect, said determining, based on a state of one of the two memory cell array subblocks together with a relative position relationship between the two memory cell array subblocks, an operation strategy of the other memory cell array subblock, comprises: when the first memory cell array subblock is in a programmed state and needs an erasing operation, while data stored in the second memory cell array subblock is obsolete, performing an erasing operation on both the first memory cell array subblock and the second memory cell array subblock.

The method of the above aspect further comprises: when the second memory cell array subblock is in a programmed state, the first memory cell array subblock has a programming/erasing cycle count less than or equal to a first preset value.

In the above aspect, the method further comprises, when the programming/erasing cycle count of the first memory cell array subblock is greater than the first preset value, prohibiting a programming/erasing operation on the first memory cell array subblock, until data stored in the second memory cell array subblock is erased.

In the above aspect, the method further comprises: when the programming/erasing cycle count of the first memory cell array subblock is greater than the first preset value, performing an erasing operation and a programming operation on the data stored in the second memory cell array subblock, subsequently the first memory cell array subblock being capable of being used to perform a programming operation and a erasing operation.

In the above aspect, the method further comprises: using a wear leveling algorithm to process the first memory cell array subblock and the second memory cell array subblock, so that a difference between a programming/erasing cycle count of the first memory cell array subblock and a programming/erasing cycle count of the second memory cell array subblock is less than a second preset value.

In the above aspect, said when using the subblock mode to perform the erasing, reading, or programming operation on the memory cell array block, determining, at least based on a state of one of the two memory cell array subblocks, an operation strategy of the other memory cell array subblock comprises: when using the subblock mode to perform a reading operation on the memory cell array block, determining, based on a state of each of the two memory cell array subblocks, a voltage control strategy to be used when a reading operation is performed on a memory cell array subblock in the programmed state among the two memory cell array subblocks.

In the above aspect, said determining, based on a state of each of the two memory cell array subblocks, a voltage control strategy to be used when a reading operation is performed on a memory cell array subblock in the programmed state, comprises: when the subblock mode is used to perform a reading operation on the memory cell array block, and the memory cell array subblock on which the reading operation is to be performed is in the programmed state, a first reading voltage is applied to a selected word line layer in the memory cell array subblock on which the reading operation is to be performed when the other memory cell array subblock is in the erased state, and a second reading voltage is applied to a selected word line layer in the memory cell array subblock on which the reading operation is to be performed when the other memory cell array subblock is in the programmed state, the first reading voltage being less than the second reading voltage.

In the above aspect, the first reading voltage and the second reading voltage are obtained by superposition of a reference reading voltage and a compensation voltage.

In the above aspect, the method further comprises: storing, when the other memory cell array subblock is in an erased state, a reading voltage offset marker of the memory cell array block as a first state representing that the compensation voltage is less than zero, and storing, when the other memory cell array subblock is in a programmed state, the reading voltage offset marker of the memory cell array block as a second state representing that the compensation voltage is zero.

In the above aspect, the method further comprises: updating a corresponding reading voltage offset marker of the memory cell array block, when a programmed state of any of the memory cell array subblocks changes.

BRIEF DESCRIPTION OF THE DRAWINGS

FIG. 2B illustrates a diagram of an exemplary solid state drive (SSD) having memory devices according to some aspects of the present disclosure;

DETAILED DESCRIPTION

Figure 1:
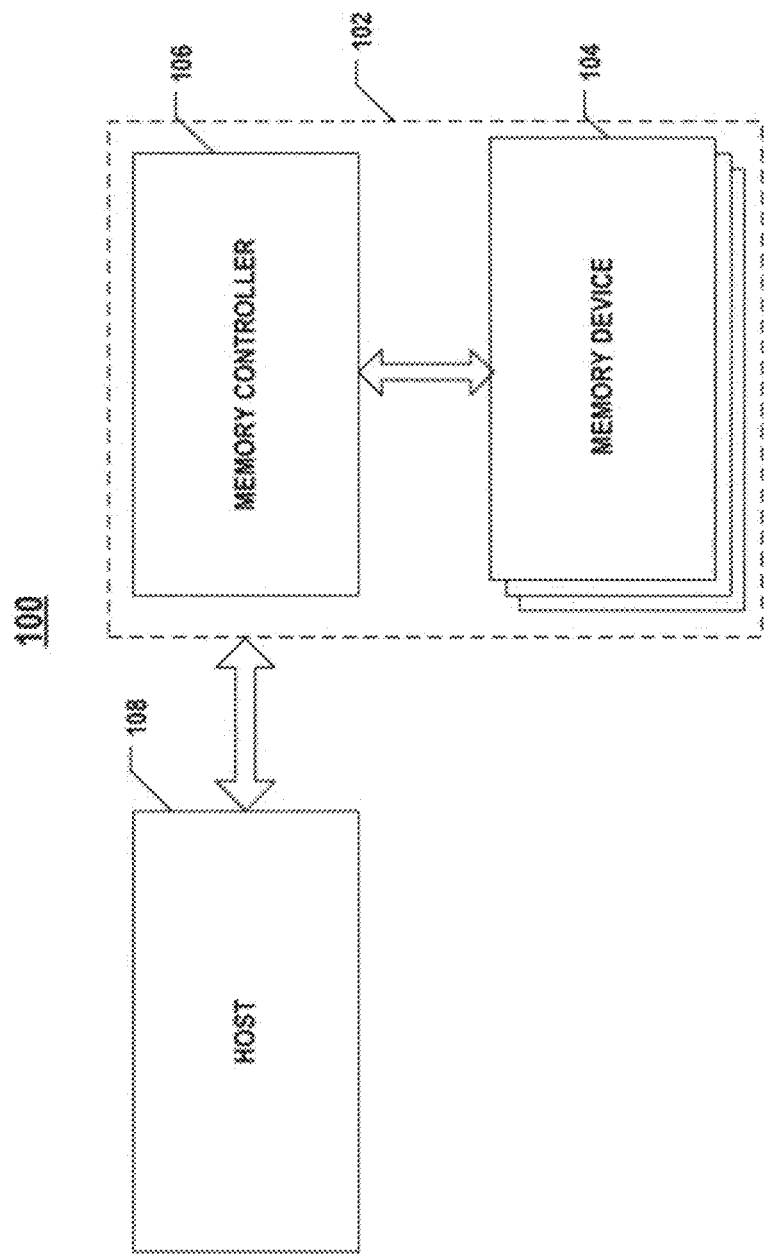
FIG. 1 illustrates a block diagram of an exemplary system having memory devices according to some aspects of the present disclosure.

Exemplary embodiments of the present disclosure will be described in greater detail below with reference to the accompanying drawings. While exemplary embodiments of the present disclosure are shown in the accompanying drawings, it should be appreciated that the present disclosure can be implemented in various forms and should not be limited by the specific embodiments set forth herein. Rather, these embodiments are provided to develop an understanding of the present disclosure and to communicate the scope of the present disclosure to those skilled in the art.

As described below, a great many specific details are given to provide an understanding of the present disclosure. However, the present disclosure can be implemented without one or more of these details. In other examples, some technical features that are well-known in the art are not described in order to avoid confusion with the present disclosure. That is, all features of actual embodiments are not described here, and functions and structures that are well-known are not described in detail.

In the accompanying drawings, the dimensions of the layers, zones, and elements, as well as their relative dimensions, may be exaggerated for the sake of clarity. Throughout the drawings, the same numerals reference the same elements.

It should be understood that when an element or a layer is referred to as "on", "adjacent to", "connected to", or "coupled to" other elements or layers, it may be directly on, adjacent to, connected to, or coupled to other elements or layers, or there may be interposed elements or layers. Conversely, when an element is referred to as "directly on," "directly adjacent to," "directly connected to," or "directly coupled to" other elements or layers, there are no interposed elements or layers. It should be understood that while the terms "first," "second," "third," etc., may be used to describe various elements, parts, zones, layers, and/or portions, these elements, parts, zones, layers, and/or portions should not be limited by these terms. These terms are used only to distinguish one element, part, zone, layer, or portion from another element, part, zone, layer, or portion. Thus, without departing from the teachings of this disclosure, the first element, part, zone, layer, or portion discussed below may be represented as a second element, part, zone, layer, or portion. When a second element, part, zone, layer, or portion is discussed, it does not mean that a first element, part, zone, layer, or portion necessarily exists in the present disclosure.

Spatial relationship terms such as "under", "below", "the below", "on", "above", "the above", etc. may be used herein for ease of description, and thereby used to describe the relationship of one element or feature shown in the drawings with other elements or features. It should be understood that in addition to the orientations shown in the drawings, the spatial relationship terminology is intended to include different orientations of the device in use and operation. For example, if the device in the accompanying drawings is turned over, then the element or feature described as "under" or "below" other elements will be oriented to be "on" or "above" the other elements or features. Thus, the exemplary terms "under" and "below" may include both up and down orientations. The device may be oriented in other ways (rotated 90 degrees or in other orientations) and the spatial description terms used herein are interpreted accordingly.

The terminology used herein is intended to describe specific embodiments only, and is not intended to be a limitation of the present disclosure. When used herein, the singular forms "a", "an", and "the/that" are also intended to include the plural forms, unless the context clearly indicates otherwise. It is also to be understood that the terms "comprising" and/or "including", when used in this specification, identify the presence of the features, integers, steps, operations, components and/or parts, but do not exclude the presence of one or more other features, integers, steps, operations, components, and/or parts and/or components and/or groups. As used herein, the term "and/or" includes any and all combinations of the relevant listed items.

In order to provide a more detailed understanding of the features and technical aspects of implementations of the present disclosure, embodiments of the present disclosure are described in detail below together with the accompanying drawings, which are provided for illustrative purposes only and are not intended to limit the embodiments of the present disclosure.

FIG. 1 illustrates a block diagram of an exemplary system 100 having memory devices, according to some aspects of the present disclosure. System 100 can be a mobile phone, a desktop computer, a laptop computer, a tablet, a vehicle computer, a gaming console, a printer, a positioning device, a wearable electronic device, a smart sensor, a virtual reality (VR) device, an argument reality (AR) device, or any other suitable electronic devices having memory devices therein. As shown in FIG. 1, the system 100 can include a host 108 and a memory system 102 having one or more memory devices 104 and a memory controller 106. The host 108 can be a processor of an electronic device, such as a central processing unit (CPU), or a system-on-chip (SoC) (such as an application processor (AP)). The host 108 can be configured to send or receive data to or from the memory devices 104.

The memory devices 104 can be any memory device disclosed in the present disclosure. As disclosed in detail below, during an erasing operation, the memory devices 104, such as NAND Flash memory devices, may have a reduced leakage current from a drive transistor (e.g., a string driver) coupled to an unselected word line, which allows for further size reduction of the drive transistor.

The memory controller 106 is coupled to the memory devices 104 and the host 108 and is configured to control the memory devices 104, according to some implementations. The memory controller 106 can manage the data stored in the memory devices 104 and communicate with the host 108. In some implementations, the memory controller 106 is designed for operating in a low duty-cycle environment like secure digital (SD) cards, compact Flash (CF) cards, universal serial bus (USB) Flash drives, or other media for use in electronic devices, such as personal computers, digital cameras, mobile phones, etc. In some implementations, the memory controller 106 is designed for operating in a high duty-cycle environment such as SSDs or embedded multimedia-cards (eMMCs) used as data storages for mobile devices, such as smartphones, tablets, laptop computers, etc., and enterprise storage arrays. The memory controller 106 can be configured to control operations of the memory devices 104, such as reading, erasing, and programming operations. The memory controller 106 can also be configured to manage various functions with respect to the data stored or to be stored in the memory devices 104, including, but not limited to, bad-block management, garbage collection, logical-to-physical address conversion, wear leveling, etc. In some implementations, the memory controller 106 is further configured to process error correction codes (ECCs) with respect to the data read from or programmed/written into the memory devices 104. Any other suitable functions may be performed by the memory controller 106 as well, for example, formatting the memory devices 104. The memory controller 106 may communicate with an external device (e.g., the host 108) according to a specific communication protocol. For example, the memory controller 106 may communicate with external devices via at least one of various interface protocols, such as the USB protocol, the MMC protocol, the Peripheral Component Interconnect (PCI) protocol, the PCI-E (Peripheral Component Interconnect Express) protocol, Advanced Technology Attachment (ATA) protocol, Serial ATA protocol, Parallel ATA protocol, Small Computer System Interface (SCSI) protocol, Enhanced Small Drive Interface (ESDI) protocol, Integrated Development Environment (IDE) protocol, Firewire protocol, etc.

Figure 2A:
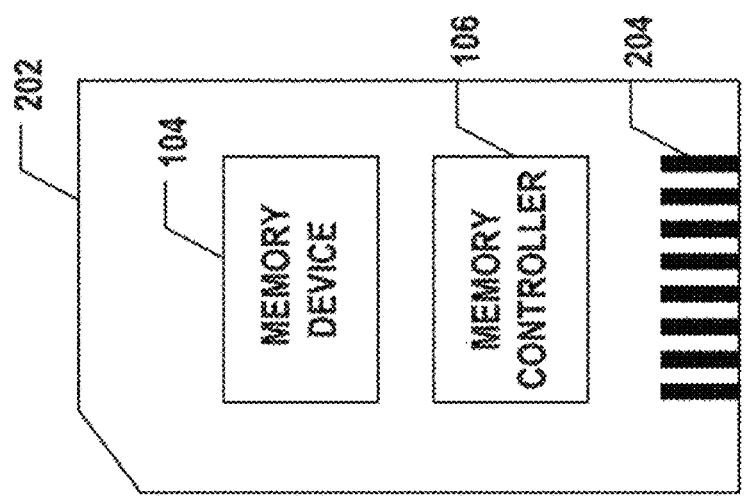
FIG. 2A illustrates a diagram of an exemplary memory card having a memory device according to some aspects of the present disclosure.

The memory controller 106 and one or more of the memory devices 104 may be integrated into various types of storage devices, e.g., included in the same package (e.g., Universal Flash Storage (UFS) package or eMMC package). That is, the memory system 102 can be implemented and packaged into different types of end electronics. In one example as shown in FIG. 2A, the memory controller 106 and individual memory devices 104 may be integrated into a memory card 202. The memory card 202 may include a PC card (PCMCIA, Personal Computer Memory Card International Association), a CF card, a smart media (SM) card, a memory stick, a multimedia card (MMC, RS-MMC, MMC-micro), an SD card (SD, miniSD, microSD, SDHC), UFS, etc. The memory card 202 may also include a memory card connector 204 that couples the memory card 202 to a host (e.g., the host 108 in FIG. 1). In another example as shown in FIG. 2B, the memory controller 106 and a plurality of memory devices 104 may be integrated into an SSD 206. The SSD 206 may also include an SSD connector 208 that couples the SSD 206 to a host (e.g., the host 108 in FIG. 1). In some embodiments, the storage capacity and/or operating speed of the SSD 206 is greater than the storage capacity and/or operating speed of the memory card 202.

Figure 3:
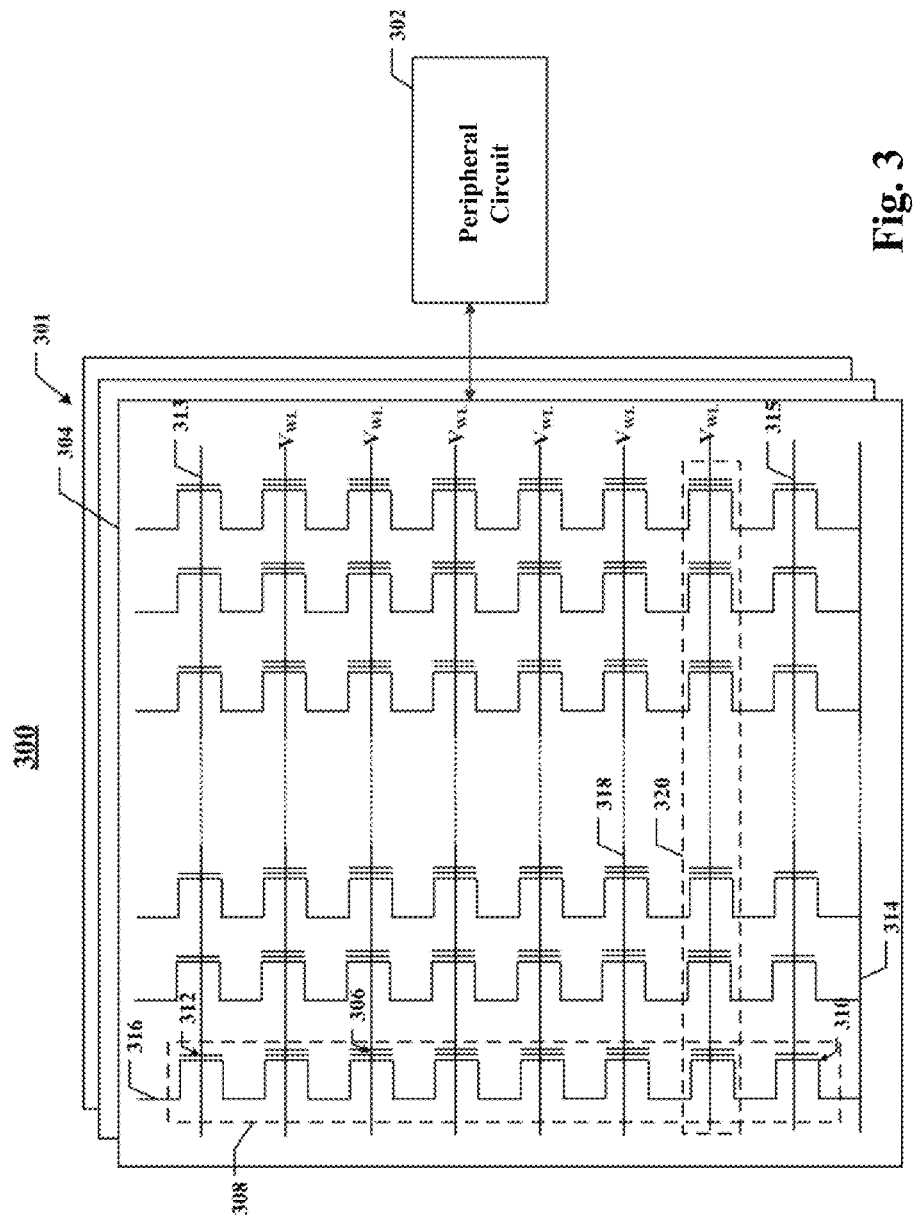
FIG. 3 illustrates a schematic diagram of an exemplary memory device including a peripheral circuit, in accordance with some aspects of the present disclosure.

FIG. 3 illustrates a schematic circuit diagram of an exemplary memory device 300 including a peripheral circuit in accordance with some aspects of the present disclosure. The memory device 300 may be an example of the memory devices 104 of FIG. 1. The memory device 300 may include a memory cell array device 301 and a peripheral circuit 302 coupled to the memory cell array device 301. The memory cell array device 301 may be an NAND flash memory cell array, wherein the memory cells 306 are provided in the form of an array of NAND memory strings 308, each NAND memory string 308 extending vertically above a semiconductor layer (not shown). In some embodiments, each NAND memory string 308 includes a plurality of memory cells 306 coupled in series and stacked vertically. Each memory cell 306 may hold a continuous analog value, e.g., a voltage or a charge value, that depends on the number of electrons captured within the region of the memory cell 306. Each memory cell 306 may be a floating-gate type memory cell including a floating-gate transistor, or a charge-trapping type memory cell including a charge-trapping transistor.

In some implementations, each memory cell 306 is a single-level cell (SLC) with two possible memory states and thus can store one bit of data. For example, a first memory state "0" may correspond to a first voltage range, and a second memory state "1" may correspond to a second voltage range. In some implementations, each memory cell 306 is a multi-level cell (MLC) capable of storing more than a single bit of data in more than four memory states. For example, the MLC may store two bits per cell, three bits per cell (also known as a tertiary-level cell (TLC)), or four bits per cell (also known as a quad-level cell (QLC). Each MLC can be programmed to take a range of possible nominal storage values. In one example, if each MLC stores two bits of data, the MLC can be programmed to take one of the three possible programmed levels from the erased state by programming one of the three possible nominal storage values into the cell. A fourth nominal memory value can be used for the erased state.

As shown in FIG. 3, each NAND memory string 308 may include a source selection gate (SSG) 310 at its source terminal and a drain selection gate (DSG) 312 at its drain terminal. The SSG 310 and DSG 312 may be configured to activate selected NAND memory strings 308 (columns of the array) during reading and programming operations. In some implementations, the source poles of the NAND memory strings 308 in the same block 304 are coupled via the same source line (SL) 314 (e.g., common SL). In other words, according to some implementations, all NAND memory strings 308 in the same block 304 have an Array Common Source (ACS). According to some implementations, DSG 312 of each NAND memory string 308 is coupled to a corresponding bit line 316, and data can be read from or programmed in the bit line 316 via an output bus (not shown). In some implementations, each NAND memory string 308 is configured to apply a select voltage (e.g., above a threshold voltage for transistors having DSG 312) or deselect voltage (e.g., 0V) to the corresponding DSG 312 via one or more DSG lines 313 and/or apply a select voltage (e.g., above a threshold voltage for transistors having SSG 310) or a deselected voltage (e.g., 0V) to the corresponding SSG 310 via one or more SSG lines 315.

As shown in FIG. 3, NAND memory strings 308 can be organized into multiple blocks 304, each of which can have a common source line 314 (e.g., coupled to the ground). In some implementations, each block 304 is the basic data unit for erasing operations, i.e., all memory cells 306 on the same block 304 are erased at the same time. To erase memory cells 306 in a selected block 304a, source lines 314 coupled to selected block 304a as well as unselected blocks 304b in the same plane as selected block 304a can be biased with an erase voltage (Vers) (such as a high positive voltage (e.g., 20V or more)). It is understood that in some examples, erasing operations may be performed at a half-block level, a quarter-block level, or a level having any suitable number of blocks or any suitable fractions of a block. Memory cells 306 of adjacent NAND memory strings 308 can be coupled through word lines 318 that select which row of memory cells 306 is affected by reading and programming operations. In some implementations, each word line 318 is coupled to a page 320 of memory cells 306, which is the basic data unit for programming operations. The size of one page 320 in bits can relate to the number of NAND memory strings 308 coupled by word lines 318 in one block 304. Each word line 318 can include a plurality of control gates (gate electrodes) at each memory cell 306 in a respective page 320 and gate lines coupling the control gates.

Figure 4:
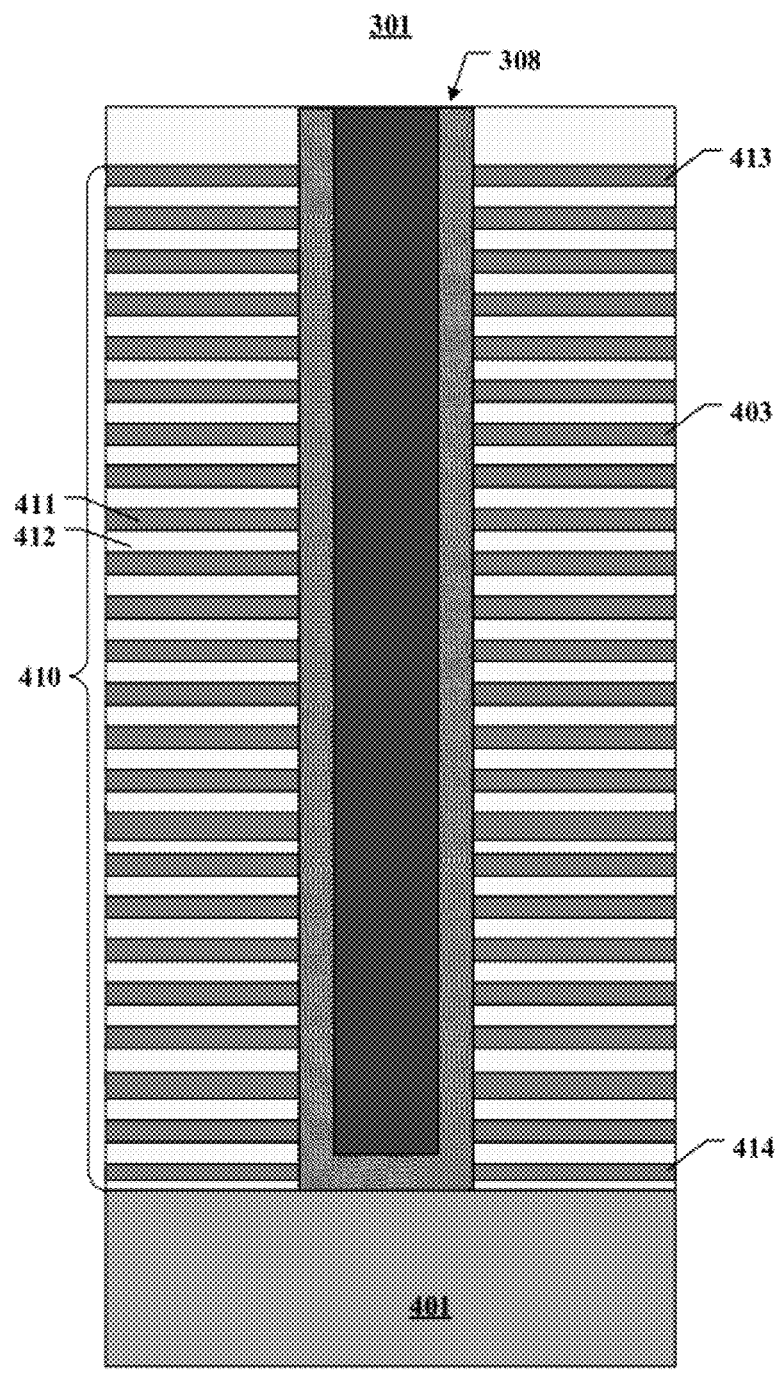
FIG. 4 illustrates a side view of a cross-section of an exemplary memory cell array having a NAND memory string, according to some aspects of the present disclosure.

FIG. 4 illustrates a side view of a cross section of an exemplary memory cell array 301 including NAND memory strings 308, in accordance with some aspects of the present disclosure. The NAND memory string 308 may include a laminated structure 410 comprising a plurality of gate layers 411 and a plurality of insulating layers 412 laminated alternately in a sequence, and a memory string 308 extending vertically through the gate layers 411 and the insulating layers 412. The gate layer 411 and the insulating layer 412 may be alternately laminated, with two gate layers 411 adjacent to each other separated by an insulating layer 412. The number of pairs of a gate layer 411 and an insulating layer 412 in the laminated structure 410 may determine the number of memory cells included in the memory cell array 401.

The material comprising the gate layers 411 may include a conductive material. The conductive material includes, but is not limited to, tungsten (W), cobalt (Co), copper (Cu), aluminum (Al), polycrystalline silicon, doped silicon, silicides, or any combination thereof. In some embodiments, each gate layer 411 includes a metal layer, for example, a tungsten layer. In some embodiments, each gate layer 411 includes a doped polysilicon layer. Each gate layer 411 may include a control gate surrounding the memory cell. The gate layer 411 at the top of the laminated structure 410 may extend laterally to form an upper selection gate line, the gate layer 411 at the bottom of the laminated structure 410 may extend laterally to form a lower selection gate line, and the gate layers 411 extending laterally between the upper selection gate line and the lower selection gate line may serve as word line layers.

In some embodiments, the laminated structure 410 may be provided on a semiconductor layer 401. The semiconductor layer 401 may include silicon (e.g., monocrystalline silicon), silicon germanium (SiGe), gallium arsenide (GaAs), germanium (Ge), silicon on insulator (SOI), germanium on insulator (GOI), or any other suitable material.

In some embodiments, the NAND memory string 308 includes a trench structure extending vertically through the laminated structure 410. In some embodiments, the trench structure includes trench holes filled with (one or more) semiconductor material (e.g., as a semiconductor trench) and (one or more) dielectric material (e.g., as a memory film). In some embodiments, the semiconductor channel comprises silicon, e.g., polysilicon. In some embodiments, the memory film is a composite dielectric layer including a tunneling layer, a storage layer (also referred to as a "charge capture/storage layer"), and a blocking layer. The trench structure may have a cylindrical shape (e.g., a column-like shape). According to some embodiments, the semiconductor channel, the tunneling layer, the storage layer, and the blocking layer are arranged in this sequence radially from the center of the column toward the outer surface of the column. The tunneling layer may include silicon oxide, silicon nitride, or any combination thereof. The storage layer may include silicon nitride, silicon nitride oxide, or any combination thereof. The blocking layer may include silicon oxide, silicon nitride oxide, a high-dielectric-constant (high k) dielectric, or any combination thereof. In one example, the memory film may include a composite layer of silicon oxide/silicon nitride oxide/silicon oxide (ONO).

Figure 5:
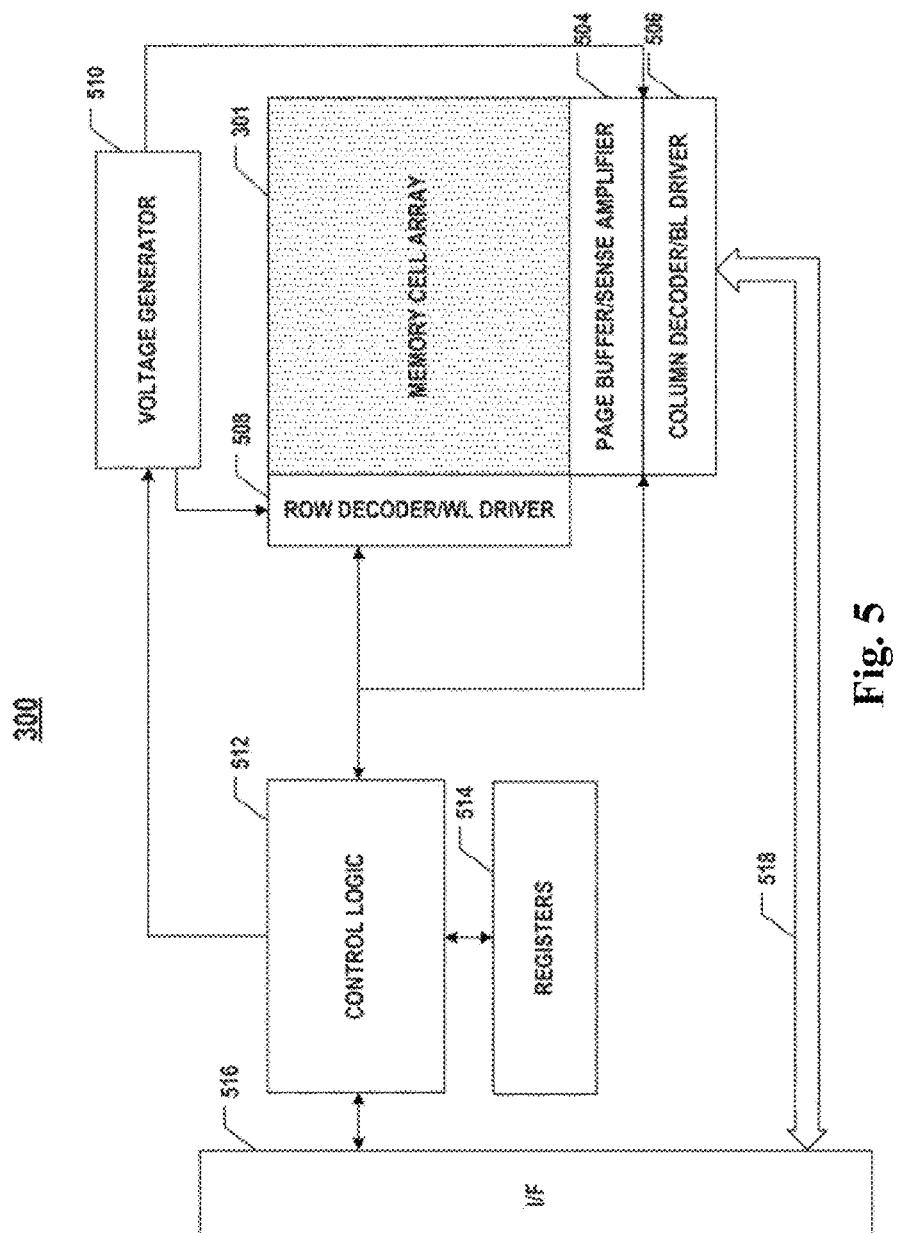
FIG. 5 illustrates a block diagram of an exemplary memory having a memory cell array and a peripheral circuit, according to some aspects of the present disclosure.

Referring back to FIG. 3, the peripheral circuit 302 may be coupled to the memory cell array 301 via bit lines 316, word lines 318, source lines 314, SSG lines 315, and DSG lines 313. The peripheral circuit 302 may include any suitable analog, digital, and mixed signal circuit for applying voltage signals and/or current signals to each target memory cell 306 or sensing voltage signals and/or current signals from each target memory cell 306, via the bit lines 316, the word lines 318, the source lines 314, the SSG lines 315, and the DSG lines 313, so as to facilitate operations on the memory cell array 301. The peripheral circuit 302 may include various types of peripheral circuits formed using metal-oxide-semiconductor (MOS) technology. For example, FIG. 5 illustrates some exemplary peripheral circuits where the peripheral circuit 302 includes a page buffer/sense amplifier 504, a column decoder/bit line driver/column driver 506, a row decoder/word line driver/row driver 508, a voltage generator 510, a control logic 512, registers 514, an interface 516, and a data bus 518. It should be understood that, in some examples, it may also include additional peripheral circuits not shown in FIG. 5.

The page buffer/sense amplifier 504 may be configured to read data from the memory cell array 301 and program (write) data into the memory cell array 301, based on control signals from the control logic 512. In one example, the page buffer/sense amplifier 504 may store a page of programmed data (written data) to be programmed into a page 320 of the memory cell array 301. In another example, the page buffer/sense amplifier 504 may perform a programming verification operation to ensure that the data has been properly programmed into the memory cell 306 coupled to the selected word line 318. In yet another example, the page buffer/sensing amplifier 504 may also sense a low power signal from the bit line 316 indicating the data bits stored in the memory cell 306, and amplify the small voltage swing to a recognizable logic level during the reading operation. The column decoder/bit line driver/column driver 506 may be configured to be controlled by the control logic 512, and select one or more NAND memory strings 308 by applying a bit line voltage generated from the voltage generator 510.

The row decoder/word line driver/row driver 508 may be configured to be controlled by the control logic 512, select/unselect blocks 304 of the memory cell array 301, and select/unselect word lines 318 of the blocks 304. The row decoder/word line driver/row driver 508 may also be configured to drive the word lines 318 using a word line voltage generated from the voltage generator 510. In some implementations, the row decoder/word line driver/line driver 508 may also select/unselect and drive the SSG lines 315 and the DSG lines 313. As described in detail below, the row decoder/word line driver/line driver 508 is configured to perform an erasing operation on the memory cells 306 coupled to (one or more) selected word lines 318. The voltage generator 510 may be configured to be controlled by the control logic 512 and generate word line voltages (e.g., a reading voltage, a programming voltage, a pass-through voltage, a local voltage, a verifying voltage, etc.), bit line voltages, and source line voltages to be supplied to the memory cell array 301.

The control logic 512 may be coupled to each of the peripheral circuits described above, and configured to control the operations of each peripheral circuit. The registers 514 may be coupled to control logic 512 and include a status register, a command register, and an address register for storing status information, command operation codes (OP codes), and command addresses for controlling the operations of each peripheral circuit. The interface 516 may be coupled to the control logic 512, and serve as a control buffer to buffer control commands received from the host (not shown) and relay them to control logic 512, and to buffer status information received from control logic 512 and relay it to the host. Interface 516 may also be coupled to a column decoder/bit line driver/column driver 506 via the data bus 518 and serves as a data I/O interface and data buffer to buffer and relay data to or from the memory cell array 301.

As previously mentioned, with the continuous development of the memory technology, the number of memory cell layers included in the memory device has increased from 24 to 48, 96, 128, 176 and more. Due to limitations in the process, memory devices containing more than 48 memory cell layers need to be formed by using multiple laminated sub-stacked structures ("Decks"), where in the memory cell array block, the CHs (Channel Hole) of individual decks are connected and together form the CH of the memory device.

In some embodiments, the erasing, programming, and reading operations on the memory device may all be based on a single memory cell array block. It is contemplated that, for memory devices having multiple decks, a single memory cell array block may be divided into multiple memory cell array subblocks, using a dummy word line layer as a control switch. If each deck can be treated separately as a different memory cell array subblock (or called a partial block), the memory device can meet both high and low capacity requirements under the current hardware conditions. Currently, the memory firmware is generally designed to operate individually on one memory cell array block, and it is of practical significance to be able to accommodate the individual operation of memory cell array subblocks with as little firmware update as possible.

Embodiments of the present disclosure provide a method of operating a memory device, the memory device comprising at least one memory cell array block and a control logic; wherein the memory cell array block includes multiple layers of memory cells and word line layers provided corresponding to individual layers of memory cells; the memory cell array block is divided into at least two memory cell array subblocks, each memory cell array subblock including a number of layers of memory cells and word line layers provided corresponding to individual layers of memory cells; and the method comprises: performing an erasing, reading or programming operation on the memory cell array block using a block mode or a subblock mode; and when the erasing, reading or programming operation is performed on the memory cell array block using the subblock mode, determining, at least based on a state of one of the two memory cell array subblocks, an operation strategy of the other memory cell array subblock.

Here, the block mode represents that one memory cell array block of the memory device is selected as a target block, and a corresponding operation is performed on the target block; and the subblock mode represents that a memory cell array subblock of the memory is selected as a target block, and a corresponding operation is performed on the target block. The operation strategy may comprise a state or a voltage control strategy employed in performing the corresponding operation. The state may be an erased state or a programmed state.

Here, said one memory cell array block comprises at least two memory cell array subblocks. In some specific examples, said one memory cell array block may comprise two memory cell array subblocks, three memory cell array subblocks, or four memory cell array subblocks, etc.

For ease of understanding, a memory cell array block including two memory cell array subblocks is taken as an example in the following description.

In some embodiments, the memory cell array block comprises at least: a first memory cell array subblock positioned close to a semiconductor layer, and a second memory cell array subblock positioned on the first memory cell array subblock.

Here, a memory cell array block of the memory device includes two memory cell array subblocks. The memory device includes two decks; wherein the deck of the two decks, at a bottom position, closer to the semiconductor layer is the first memory cell array subblock, and the deck of the two decks, at a higher position, above the deck at the bottom position is the second memory cell array subblock.

In some embodiments, the first memory cell array subblock comprises a first number of word line layers, and the second memory cell array subblock comprises a second number of word line layers, wherein the first number and the second number may be the same or different.

In some embodiments, considering that the deck at the bottom position is more stable than on the deck in the higher position, the number of the memory cell layers contained in the deck at the bottom position is more than the number of the memory cell layers contained in the deck at the higher position. That is, there is an asymmetric structure between the decks, and the decks contain different numbers of word line layers.

In some embodiments, there may be a symmetric structure between the decks, i.e., the number of the memory cell layers contained in the deck at the bottom position is the same as the number of the memory cell layers contained in the deck at the higher position.

In order to accommodate manufacturing requirements, in addition to the conventional word line layers, at least one dummy word line layer is present in the deck. In embodiments of the present application, the at least one dummy word line layer may be used as a switch control for implementing the subblock division of the memory cell array.

Based on this, in some embodiments, the memory cell array block further comprises: at least one dummy memory cell layer provided between the first memory cell array subblock and the second memory cell array subblock; and corresponding at least one dummy word line layer.

Here, memory cell layers coupled to the at least one dummy word line layer are not used to store data.

Figure 6:
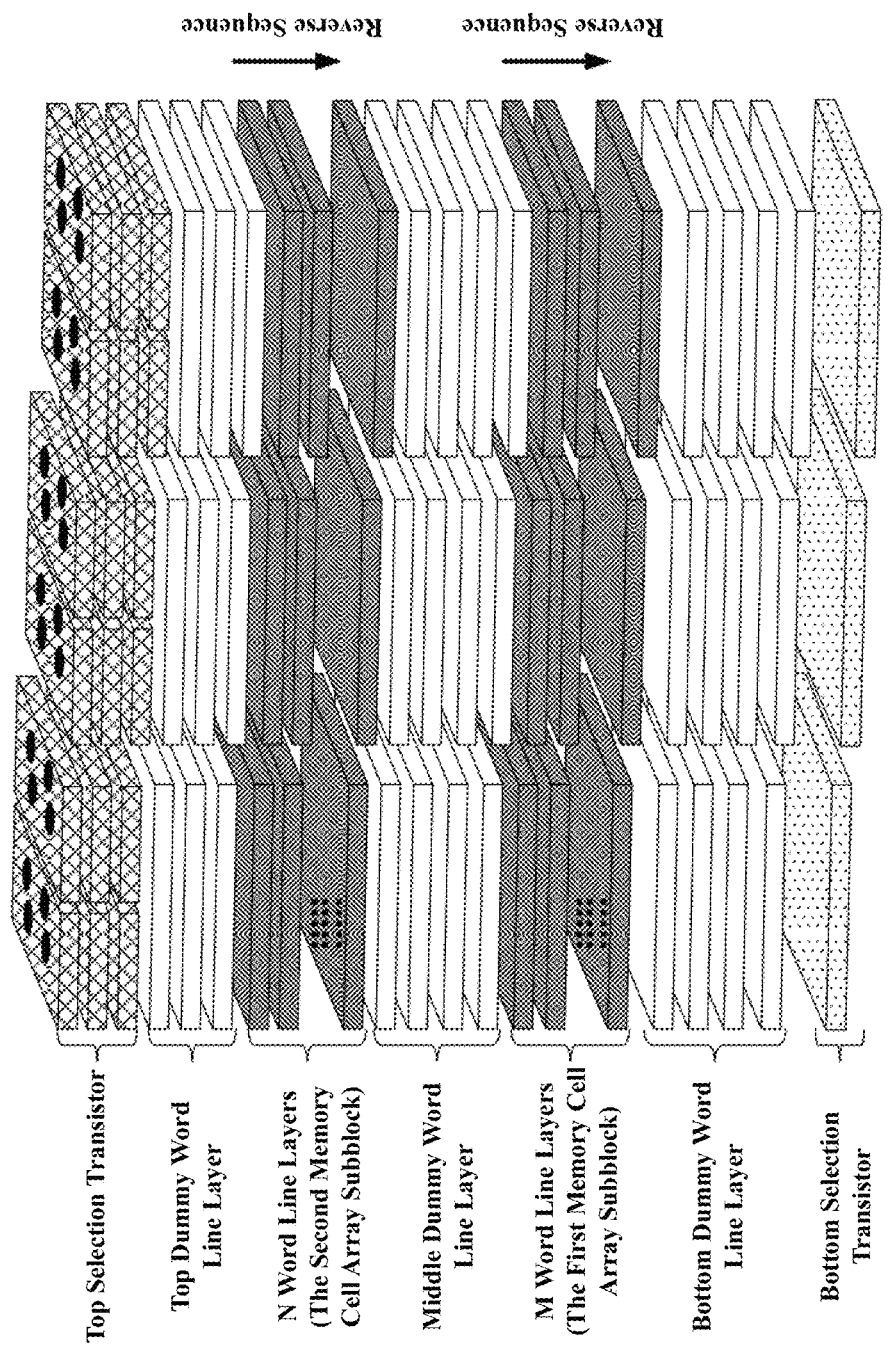
FIG. 6 illustrates a schematic diagram of an exemplary memory cell array block of a memory device provided by embodiments of the present disclosure.

The single memory cell array block shown in FIG. 6 is used as an example for description. In FIG. 6, the single memory cell array block comprises: one layer of bottom selection transistors; four layers of bottom dummy word line layers, for example, located on the bottom selection transistors; M word line layers on the bottom dummy word line layers, for example; four middle dummy word line layers located on the M word line layers, for example; N word line layers located on the middle dummy word line layers; three top dummy word line layers located on the N word line layers; and top selection transistors located on the top dummy word line layers.

Then, when the memory cell array block is operated in a subblock mode, the M word line layers located on the bottom dummy word line layers can be understood as a first memory cell array subblock, and the N word line layers located on the middle dummy word line layers can be understood as a second memory cell array subblock. As an example, M=N=88. Moreover, the middle dummy word line layers can be used as a switch control between the first memory cell array subblock and the second memory cell array subblock. For example, two of the four middle dummy word line layers close to the M word line layers (the first memory cell array subblock) can be used as the top selection transistors of the first memory cell array subblock; and two of the four middle dummy word line layers close to the N word line layers (the second memory cell array subblock) can be used as the bottom selection transistors of the second memory cell array subblock. In this situation, when the memory cell array block is operated in the block mode, the middle dummy word line layers have essentially the same function as the M-layer word line layers and the N-layer word line layers, but the memory cell layers coupled to the dummy word line layers are not used to store data.

It is noted that here and in the below, the examples of the number of the layers in the memory cell array block are intended to be used as examples only and are not intended to limit the number of the layers in the memory cell array block in embodiments of the present application.

In some embodiments, the method further comprises: with respect to both the first memory cell array subblock and the second memory cell array subblock, using the same programming sequence as that used when programming operations are performed using the block mode on the memory cell array block.

In some specific examples, when corresponding operations are performed using the block mode on the memory device, the memory device is programmed using a reverse programming sequence. Still taking FIG. 6 as an example, it means that the programmed sequence for a single memory cell array block is from the memory cell layer corresponding to the word line layer at level 0 down to the memory cell layer corresponding to the word line layer at level 175.

In some embodiments, the method further comprises: with respect to both the first memory cell array subblock and the second memory cell array subblock, programming operations are performed using a reverse programming sequence; wherein the first memory cell array subblock is programmed sequentially from a memory cell layer closest to the dummy memory cell layers to a memory cell layer closest to the bottom selection grid; and the second memory cell array subblock is programmed sequentially from a memory cell layer closest to the top selection grid to a memory cell layer closest to the dummy memory cell layers.

Again, taking FIG. 6 as an example for description, in FIG. 6, the programming sequence of the 88 word line layers (the first memory cell array subblock) located above the bottom dummy word line layers is from the memory cell layer corresponding to the 88th word line layer down to the memory cell layer corresponding to the 175th word line layer. The programming sequence of the 88 word line layers (the second memory cell array subblock) located above the central dummy word line layers is from the memory cell layer corresponding to the 0th word line layer down to the memory cell layer corresponding to the 87th word line layer. The programming sequences of the first memory cell array subblock and the second memory cell array subblock can be referred to the directions indicated by the arrows in FIG. 6.

In some embodiments, the method further comprises: with respect to both the first memory cell array subblock and the second memory cell array subblock, the programming operations are both performed in a forward programming sequence; wherein the first memory cell array subblock is programmed sequentially from the memory cell layer closest to the bottom selection grid to the memory cell layer closest to the dummy memory cell layers; and the second memory cell array subblock is programmed from the memory cell layer closest to the dummy memory cell layers to the memory cell layer closest to the top selection grid. It will be appreciated that, at this point, if the block mode is not used to program the memory cell array blocks, the programming sequence is from the memory cell layer closest to the bottom selection grid to the memory cell layer closest to the top selection grid.

In alternative embodiments, the method further comprises: programming the first memory cell array subblock and the second memory cell array subblock in a different programming sequence; wherein the first memory cell array subblock is programmed sequentially from the memory cell layer closest to the dummy memory cell layers to the memory cell layer closest to the bottom selection grid; and the second memory cell array subblock is programmed sequentially from the memory cell layer closest to the dummy memory cell layers to the memory cell layer closest to the top selection grid.

Taking the single memory cell array block as shown in FIG. 6 as an example, in FIG. 6, the 88 word line layers (the first memory cell array subblock) located above the bottom dummy word line layers are programmed from the memory cell layer corresponding to the 88th word line layer down to the memory cell layer corresponding to the 176th word line layer. The 88 word line layers (the second memory cell array subblock) located above the middle dummy word line layers are programmed from the memory cell layer corresponding to the 87th word line layer down to the memory cell layer corresponding to the 0th word line layer.

It is understood that when both the first memory cell array subblock and the second memory cell array subblock are programmed in the same programming sequence as that used when the memory cell array block is programmed using the block mode, both the block mode and the subblock mode can be supported as the two modes are programmed in the same sequence, and the same page maps table can be used. Thus, it is possible to save the design costs associated with a difference between the two.

In some embodiments, said determining, based on a state of one of the two memory cell array subblocks, an operation strategy of the other memory cell array subblock comprises: determining, based on a state of one of the two memory cell array subblocks together with a relative position relationship between the two memory cell array subblocks, an operation strategy of the other memory cell array subblock.

Here, when determining the operation strategy of a certain one (a to-be-determined memory cell array subblock) of the two memory cell array subblocks, both a state of the other memory cell array subblock of the two memory cell array subblocks (a not-to-be-determined memory cell array subblock) and a relative position relationship between the two need to be considered.

Here, the needs to consider the relative position relationship between the two memory cell array subblocks can be understood as follows: in the description here and below, a first memory cell array subblock is the memory cell array subblock provided close to a semiconductor layer, a second memory cell array subblock is the memory cell array subblock located above the first memory cell array subblock, and in the following, when referring to the first memory cell array subblock and the second memory cell, the relationship between the two is that the first memory cell array subblock is closer to the semiconductor layer while the second memory cell array subblock is further away from the semiconductor layer, and the relationship between the two is not interchangeable. In some specific examples, the memory device may receive the state of the not-to-be-determined memory cell array subblock and the relative position relationship of the to-be-determined memory cell array subblock and the not-to-be-determined memory cell array subblock from the memory system or the host, so as to determine operations that can be performed on the to-be-determined memory cell array subblock. In some embodiments, said determining, based on a state of one of the two memory cell array subblocks together with a relative position relationship between the two memory cell array subblocks, an operation strategy of the other memory cell array subblock comprises: determining, when the first memory cell array subblock is in an erased state, that the second memory cell array subblock is capable of being used to perform a programming operation and an erasing operation.

Here, if the first memory cell array subblock is in an erased state, the second memory cell array subblock can be freely used. In some specific examples, when the memory device learns, from the memory system or registers of the memory device, that the first memory cell array subblock is in an erased state, if it then receives an instruction to perform a programming operation or an erasing operation on the second memory cell array subblock, the memory device responds to the instruction to perform the programming operation and the erasing operation by performing the instruction to perform the programming operation or the erasing operation on the second memory cell array subblock.

It is appreciated that when the block mode or subblock mode is used to program the memory cell array block, and each subblock and block is programmed in the reverse sequence, if the first memory cell array subblock provided close to the semiconductor layer is in an erased state and the second memory cell array subblock above the first memory cell array subblock is to be programmed, it is the same as the programming conditions under which the block mode is used to program the memory cell array block, which means, at this point, the block mode and the sub block mode are compatible. If the first memory cell array subblock is in an erased state and the second memory cell array subblock is to be erased, the word line layers in the first memory cell array subblock need to be applied with higher hold and release voltages to ensure that they will not be erased together with the second memory cell array subblock. However, since the first memory cell array subblock is already in an erased state, there is no problem of erasure interference.

In some embodiments, said determining, based on a state of one of the two memory cell array subblocks together with a relative position relationship between the two memory cell array subblocks, an operation strategy of the other memory cell array subblock comprises: determining, when the first memory cell array subblock is in a programmed state, that the second memory cell array subblock section is capable of being used to perform an erasing operation and is not capable of being used to perform a programming operation.

Here, if the first memory cell array subblock is in the programmed state, a programming operation cannot be performed on the second memory cell array subblock. In some specific examples, when the memory device learns, from the memory system or registers of the memory device, that the first memory cell array subblock is in the programmed state, if it then receives an instruction to perform a programming operation or an erasing operation on the second memory cell array subblock, the memory device responds to the instruction for the erasing operation but not the instruction for the programming operation.

It is understood that when the block mode or the subblock mode is used to program the memory cell array block, and each subblock as well as the block is programmed in the reverse sequence, if the first memory cell array subblock positioned close to the semiconductor layer is in a programmed state and a programming operation is to be performed on the second memory cell array subblock that is above the first memory cell array subblock, it is incompatible with the programming conditions under which a block mode is used to perform a programming operation on the memory cell array block. However, if the first memory cell array subblock is in a programmed state and an erasing operation is to be performed on the second memory cell array subblock, it is not incompatible with using the block mode to perform a partial erasing operation on the memory cell array block, and therefore, at this time, an erasing operation on the second memory cell array subblock is permitted.

In some embodiments, said determining, based on a state of one of the two memory cell array subblocks together with a relative position relationship between the two memory cell array subblocks, an operation strategy of the other memory cell array subblock comprises: determining, when the second memory cell array subblock is in an erased state or a programmed state, that the first memory cell array subblock is capable of being used to perform both a programming operation and an erasing operation.

Here, if the second memory cell array subblock is in a programmed state, both programming operations and erasing operations are allowed for the first memory cell array subblock. In some specific examples, when the memory device learns, from the memory system or registers of the memory device, that the second memory cell array subblock is in a programmed state, if receiving an instruction to perform a programming operation or an erasing operation on the first memory cell array subblock, the memory device responds to the instruction for the erasing operation and the instruction for the programming operation.

It is understood that when a block mode or a subblock mode is used to perform a programming operation on the memory cell array block, and each subblock as well as the block is programmed using the reverse sequence, if the second memory cell array subblock is in a programmed state and a programming operation is to be performed on the first memory cell array subblock, it is compatible with the programming conditions under which a block mode is used to perform a programming operation on the deck at the bottom position of the memory cell array block. If the second memory cell array subblock is in a programmed state and an erasing operation is to be performed on the first memory cell array subblock, it is not incompatible with using the block mode to perform a partial erasing operation on the memory cell array block, and thus, at this time, an erasing operation on the first memory cell array subblock is also allowed.

Here, if the second memory cell array subblock is in a erased state, programming operations and erasing operations are allowed for the first memory cell array subblock. In some specific examples, when the memory device learns, from the memory system or registers of the memory device, that the second memory cell array subblock is in a programmed state, if receiving an instruction to perform a programming operation or an erasing operation on the first memory cell array subblock, the memory device responds to the instruction for the erasing operation and the instruction for the programming operation.

It is understood that when a block mode or a subblock mode is used to program the memory cell array block, and each subblock as well as the block is programmed in the reverse sequence, if the second memory cell array subblock is in an erased state and a programming operation is to be performed on the first memory cell array subblock, it is compatible with the programming conditions under which a block mode is used to perform a programming operation on the deck at the bottom position of the memory cell array block. If the second memory cell array subblock is in an erased state and an erasing operation is to be performed on the first memory cell array subblock, it is not incompatible with using the block mode to perform a partial erasing operation on the memory cell array block, and thus, at this time, an erasing operation on the first memory cell array subblock is also permitted.

In some embodiments, the method further comprises: when the first memory cell array subblock is in a programmed state and needs an erasing operation, while the second memory cell array subblock is in a programmed state, performing an erasing operation on the first memory cell array subblock.

Here, if data has been stored in both the first memory cell array subblock and the second memory cell array subblock, when an erasing operation needs to be performed on only the first memory cell array subblock, the erasing operation is allowed to be performed on the first memory cell array subblock.

It is understood that, when a block mode or a subblock mode is used to program the memory cell array block, and each subblock as well as the block is programmed in the reverse sequence, if data has been stored in both the first memory cell array subblock and the second memory cell array subblock, when an erasing operation needs to be performed on only the first memory cell array subblock, it is compatible with using the block mode to perform an erasing operation on the deck (the first memory cell array subblock) at the bottom position of the memory cell array block, and thus, at this time, the erasing operation is also allowed for the first memory cell array subblock.

In some embodiments, the method further comprises: when the first memory cell array subblock is in a programmed state and needs an erasing operation, while the data stored in the second memory cell array subblock is obsolete, performing an erasing operation on both the first memory cell array subblock and the second memory cell array subblock.

Here, if the first memory cell array subblock has been programmed (i.e., has data stored therein), the system cannot perform a programming operation on the second memory cell array subblock. Therefore, in this state, it is not necessary for the system to perform an erasing operation on the second memory cell array subblock alone. A better method is to mark the second memory cell array subblock as obsolete, and to perform, when an erasing operation needs to be performed on the corresponding first memory cell array subblock, an erasing operation on the first memory cell array subblock and the second memory cell array subblock together. Here, when the data stored in the second memory cell array subblock is no longer required to be read for use, the data stored in the second memory cell array subblock can be determined to be obsolete. In some specific embodiments, when the data stored in the second memory cell array subblock is about to be replaced by other newer data, the memory device may determine, based on instructions sent by the memory system or the host, that the current data in the second memory cell array subblock is obsolete.

In some embodiments, the method further comprises: when the second memory cell array subblock is in a programmed state, a programming/erasing cycle count of the first memory cell array subblock is less than or equal to a first preset value. Here, when the second memory cell array subblock is in a programmed state, it is required to count the programming/erasing cycles of the first memory cell array subblock, and if the second memory cell array subblock is in a programmed state and the data is not erased, the programming/erasing cycle count (PE cycle) of the first memory cell array subblock cannot exceed the first preset value; if the first preset value is exceeded, then the data stored in the first memory cell array subblock must be erased and reprogrammed (i.e., refreshed), because the multiple programming/erasing operations of the first memory cell array subblock will interfere with the data stored in the second memory cell array subblock. Here, the first preset value can be determined based on the degree of the practical interference. In some specific embodiments, the first preset value is in a range of 10-100.

In order to mitigate the above technical problem of data interference, two approaches can be adopted.

Approach I: When the programming/erasing cycle count of the first memory cell array subblock is greater than the first preset value, programming/erasing operations are prohibited to be performed on the first memory cell array subblock, until the data stored in the second memory cell array subblock is erased.

Here, when the programming/erasing cycle count of the first memory cell array subblock is greater than the first preset value, one solution is to restrict further programming operations and erasing operations on the first memory cell array subblock, so that the interference can be limited to a certain extent. After the data stored in the second memory cell array subblock is erased, the programming/erasing cycle count of the first memory cell array subblock can be reset to zero, and then programming operations and erasing operations can be performed on the first memory cell array subblock, until a new count exceeds the first preset value.

Approach II: When the programming/erasing cycle count of the first memory cell array subblock is greater than the first preset value, an erasing operation and a programming operation are performed to the data stored in the second memory cell array subblock, and subsequently, the first memory cell array subblock can be used to perform programming operations and erasing operations.

Here, when the programming/erasing cycle count of the first memory cell array subblock is greater than the first preset value, another solution is to actively rewrite the data stored in the second memory cell array subblock, so as to improve the interference with the data stored in the second memory cell array subblock due to the multiple programming/erasing operations of the first memory cell array subblock. After the data stored in the second memory cell array subblock is rewritten, the programming/erasing cycle count of the first memory cell array subblock can be reset to zero, and then the first memory cell array subblock can continue to perform programming operations and erasing operations, until a new count exceeds the first preset value.

In some embodiments, the method further comprises: processing the first memory cell array subblock and the second memory cell array subblock using a wear leveling algorithm, such that a difference between the programming/erasing cycle count of the first memory cell array subblock and a programming/erasing cycle count of the second memory cell array subblock is less than a second preset value.

Here, the second preset value can be adjusted according to the actual conditions of the memory cells, such as the erase-write life. In some specific embodiments, the second preset value may be set at 1%-10% of the erase-write life of the memory cells. Here, the wear leveling algorithm may include both a dynamic wear leveling algorithm and a static wear leveling algorithm. The basic idea of the dynamic wear leveling algorithm is to write "hot data" onto a young subblock, which means, when taking a new subblock to write, picking the one with a small number of erasing operations and writing operations; the basic idea of the static wear leveling algorithm is to write "cold data" onto an old subblock, which means, moving the cold data to a subblock with a relatively high number of erasing operations and writing operations. The so-called cold data is data that is not frequently updated by the user; on the contrary, the hot data is data that is frequently updated by the user. The so-called old subblock is a subblock with more erasing operations and writing operations; on the contrary, the young subblock is a subblock with fewer erasing operations and writing operations. The memory device can distinguish older subblocks from younger subblocks by the number of erasures.

It is to be noted that, when using the operation strategy provided in this disclosure to perform an operation on a to-be-determined memory cell array subblock, a key is that in the programming direction, there cannot be a programmed word line or subblock. On this basis, restrictions are set on programming/erasing operations. In the embodiments of this disclosure, with respect to both the first memory cell array subblock and the second memory cell array subblock, the same programming sequence is used as that used when write programming operations are performed using the block mode on the memory cell array block, and the above restrictions with respect to programming in the reverse sequence are the same as those under the condition that programming is performed in the forward sequence; however, it is required to switch the first memory cell array subblock and the second memory cell array subblock.

It can be understood that, when using the operation strategy provided in the embodiment of the present disclosure to perform an operation on a to-be-determined memory cell array subblock, certain freedom may be sacrificed during the use of the memory device; however, the block mode and the subblock mode are compatible better, and there is no need to develop a program to implement two inhibit algorithms, which significantly saves the design work of a new firmware for compatibility between the block mode and the subblock mode.

The Back Pattern Effect problem is particularly prominent when the subblock mode is used in performing reading operations. Here, the back pattern effect is mainly due to the different programmed states of the memory cells above the memory cell corresponding to the selected word line layer during the programming verification operations and the reading operations. For example, when a programming verification operation is performed on the word line layer $WL_n$, the memory cells corresponding to the word line layer $WL_{n+1}$ and above are in an erased state, while when a reading operation is performed on the word line layer $WL_n$, the memory cells corresponding to the word line layer $WL_{n+1}$ and above are already in a random pattern programmed state, which leads to a significant increase in the string resistance of the memory cells corresponding to the word line layer $WL_{n+1}$ and above when a reading operation is performed, resulting in an increase in the threshold voltage during the reading operation and a widening of the threshold voltage distribution, which increases the probability of reading retries.

Similarly, there is a similar back pattern effect among the memory cell array subblocks when the subblock mode is used to perform reading operations on the memory cell array blocks. Based on the back pattern effect, the probability of reading retries can be reduced by compensating, when the reading operation is first performed, for the applied reading voltage based on a state of each memory cell array subblock in the memory cell array block.

It should be noted that the back pattern effect of the quad-level cell QLC is particularly significant, and compensating for the reading voltage can reduce the probability of reading retries due to the back pattern effect.

In some embodiments, when using the subblock mode to perform an erasing, reading, or programming operation on the memory cell array block, determining, based on a state of at least one of the two memory cell array subblocks, an operation strategy of the other memory cell array subblock comprises: when the memory cell array block is read using the subblock mode, determining, based on a state of each of the two memory cell array subblocks, a voltage control strategy to be used when the reading operation is performed on the memory cell array subblock in a programmed state.

Here, the voltage control strategy comprises whether to perform a reading voltage compensation for the memory cell array subblock to be read. In some specific examples, a reference reading voltage is applied to the word line layers of the memory cell array subblock for which no reading voltage compensation needs to be performed, and a compensated reading voltage is applied to the word line layers of the memory cell array subblock for which a reading voltage compensation needs to be performed. In some embodiments, said determining, based on a state of each of the two memory cell array subblocks, a voltage control strategy to be used when the reading operation is performed on the memory cell array subblock in a programmed state comprising: when the memory cell array subblock on which the reading operation is to be performed is in a programmed state, if the other memory cell array subblock is in an erased state, a first reading voltage is applied to the selected word line layers in the memory cell array subblock on which the reading operation is to be performed, and if the other memory cell array subblock is in a programmed state, then a second reading voltage is applied to selected word line layers in the memory cell array subblock on which the reading operation is to be performed, the first reading voltage being less than the second reading voltage.

In some embodiments, the first reading voltage and the second reading voltage are obtained by superposition of a reference reading voltage and a compensation voltage.

In some embodiments, the method further comprises: storing a reading voltage offset marker of the memory cell array block as a first state, when the other memory cell array subblock is in an erased state, the first state representing that the compensation voltage is less than zero; and storing the reading voltage offset marker of the memory cell array block as a second state, when the other memory cell array subblock is in a programmed state, the second state representing that the compensation voltage is zero.

Here, the first state represents that it is needed to perform a reading voltage compensation for the memory cell array subblock to be read; the second state represents that there is no need to perform a reading voltage compensation for the memory cell array subblock to be read; correspondingly, the second reading voltage is a reading voltage normally applied to the selected word lines of the memory cell array subblock to be read; and the first reading voltage is a reading voltage smaller than that applied normally to the memory cell array subblock to be read.

It should be noted that, in general, a compensated reading voltage (i.e., the first reading voltage) is smaller than the normal, uncompensated reading voltage (i.e., the second reading voltage), although, of course, embodiments of the present disclosure may also support cases where the compensated reading voltage is larger than the normal, uncompensated reading voltage.

In some specific examples, Table 1 can be referred to in determining the reading voltage offset marker of the memory cell array block according to the state of each of the two memory cell array subblocks. As shown in Table 1, when one of the two memory cell array subblocks is in a programmed state and the other is not in a programmed state, the reading voltage offset is marked as YES (the first state), and when a reading operation is to be performed on the one in the programmed state of the two memory cell array subblocks, it is needed to perform a reading voltage compensation to the memory cell array block to be read; and when both the two memory cell array subblocks are in a programmed state or a unprogrammed state, the reading voltage offset is marked as NO (the second state), and when a reading operation is to be performed on one in the programmed state of the two memory cell array subblocks, there is no need to perform a reading voltage compensation to the memory cell array block to be read, which means that the normal reading voltage is to be applied.

TABLE 1

| Whether the memory cell array subblock 1 is in a programmed state | Whether the memory cell array subblock 2 is in a programmed state | Reading voltage Offset Marker |
|---|---|---|
| 0 | 0 | No |
| 0 | 1 | Yes |
| 1 | 0 | Yes |
| 1 | 1 | No |

The memory device can rely on its own resources to keep track of the reading voltage offset marker. Based on this, in some embodiments, the method further comprises: when the programmed state of any memory cell array subblocks of the memory cell array block changes, updating the reading voltage offset marker corresponding to the memory cell array block.

In some specific examples, for the reading voltage offset mark, a corresponding register/latch may be added to the memory device, such as a Static Random-Access Memory (SRAM). Each memory cell array block requires at least 1 bit (two states) to indicate whether or not a reading voltage compensation is to be performed for the memory cell array subblock to be read, i.e., whether or not a Vrd offset is needed during the reading operation. At the beginning of the reading operation, the memory device checks the information of this reading voltage offset marker to determine if a Vrd offset needs to be applied; more specifically, it is determined whether to apply the Vrd offset based on the states of the memory cell array subblocks shown in Table 1 above. Also, it is necessary to update the register/latch during programming or erasing operations, i.e., to update the value of the reading voltage offset marker corresponding to the memory cell array block when a corresponding operation is performed on any memory cell array subblocks of the memory cell array block. Since registers such as SRAMs are power-down-volatile, it is also feasible to define, in the memory device, instructions for performing an erase page check which may be based on the memory cell array subblocks, and the memory system may perform an erase page check for each memory cell array subblock after power-up, so that the information about the reading voltage offset marker may be known after power-up based on the results of the check.

In other specific examples, the memory device may also rely on the resources of the memory system to keep track of the reading voltage offset marker. This approach will be described in more detail later in the description of the memory system.

It will be appreciated that the voltage control strategy provided in embodiments of the present disclosure is used to determine whether to perform a reading voltage compensation for the memory cell array subblock to be read, more specifically, the applied reading voltage may be compensated upon the first execution of the reading operation, based on a state of each memory cell array subblock in the memory cell array block, thereby reducing the probability of read retries.

Embodiments of the present disclosure further provide a memory device comprising: at least one memory cell array block and a control logic; wherein the memory cell array block comprises multiple layers of memory cells and word line layers provided corresponding to individual layers of memory cells; the memory cell array block is divided into at least two memory cell array subblocks, each memory cell array subblock comprising a number of layers of memory cells and word line layers provided corresponding to individual layers of memory cells; the control logic is coupled to the memory cell array block, and configured to: perform a erasing, reading, or programming operation on the memory cell array block using a block mode or a subblock mode; and when the erasing, reading, or programming operation is performed on the memory cell array block using the subblock mode, determine, at least based on a state of one of the two memory cell array subblocks, an operation strategy of the other memory cell array subblock.

Here, the memory device may include the above-mentioned memory cell array device and a peripheral circuit. The memory cell array device includes at least one memory cell array block, and the peripheral circuit includes a control logic and the above-mentioned row drivers, column drivers, voltage generators, and page buffers, among others.

In some embodiments, the memory cell array block comprises at least: a first memory cell array subblock positioned close to a semiconductor layer, and a second memory cell array subblock positioned on the first memory cell array subblock.

In some embodiments, the first memory cell array subblock comprises a first number of word line layers, and the second memory cell array subblock comprises a second number of word line layers, wherein the first number is different from the second number.

In some embodiments, the memory cell array block further comprises: at least one dummy memory cell layer provided between the first memory cell array subblock and the second memory cell array subblock, and corresponding at least one dummy word line layer.

In some embodiments, the control logic is configured to use, with respect to both the first memory cell array subblock and the second memory cell array subblock, a same programming sequence as that used when a write programming operation is performed on the memory cell array block using the block mode.

In some embodiments, the control logic is configured to program both the first memory cell array subblock and the second memory cell array subblock using a reverse programming sequence; wherein the first memory cell array subblock is programmed sequentially from a memory cell layer closest to the at least one dummy memory cell layer to a memory cell layer closest to a bottom selection grid; and the second memory cell array subblock is programmed sequentially from a memory cell layer closest to a top selection grid to a memory cell layer closest to the at least one dummy memory cell layer.

In some embodiments, the control logic is configured to: determine, based on a state of one of the two memory cell array subblocks together with a relative position relationship between the two memory cell array subblocks, an operation strategy of the other memory cell array subblock.

In some embodiments, the control logic is configured to determine, when the first memory cell array subblock is in an erased state, that the second memory cell array subblock is capable of being used to perform a programming operation and an erasing operation.

In some embodiments, the control logic is configured to determine, when the first memory cell array subblock is in a programmed state, that the second memory cell array subblock is capable of being used to perform an erasing operation and is not capable of being used to perform a programming operation.

In some embodiments, the control logic is configured to determine, when the second memory cell array subblock is in an erased state or a programmed state, that the first memory cell array subblock is capable of being used to perform a programming operation and an erasing operation.

In some embodiments, the control logic is configured to perform, when the first memory cell array subblock is in a programmed state and needs an erasing operation, while the second memory cell array subblock is in a programmed state, an erasing operation on the first memory cell array subblock.

In some embodiments, the control logic is configured to perform, when the first memory cell array subblock is in a programmed state and needs an erasing operation, while data stored in the second memory cell array subblock is obsolete, an erasing operation on both the first memory cell array subblock and the second memory cell array subblock.

In some embodiments, the control logic is configured such that, when the second memory cell array subblock is in a programmed state, the programming/erasing cycle count of the first memory cell array subblock is less than or equal to a first preset value.

In some embodiments, the control logic is configured to prohibit, when the programming/erasing cycle count of the first memory cell array subblock is greater than the first preset value, programming/erasing operations on the first memory cell array subblock, until data stored in the second memory cell array subblock is erased.

In some embodiments, the control logic is configured to perform, when the programming/erasing cycle count of the first memory cell array subblock is greater than the first preset value, an erasing operation and a programming operation to the data stored in the second memory cell array subblock, after which the first memory cell array subblock is capable of being used to perform a programming operation and an erasing operation.

In some embodiments, the first preset value is in the range of 10-100.

In some embodiments, the control logic is configured to process the first memory cell array subblock and the second memory cell array subblock using a wear leveling algorithm, such that a difference between the programming/erasing cycle count of the first memory cell array subblock and a programming/erasing cycle count of the second memory cell array subblock is less than a second preset value. In some embodiments, the control logic is configured to, when using the subblock mode to perform a reading operation on the memory cell array block, determine, based on a state of each of the two memory cell array subblocks, a voltage control strategy to be used when a reading operation is performed on the memory cell array subblock in the programmed state.

In some embodiments, the control logic is configured such that, when a reading operation is to be performed using the subblock mode on the memory cell array block, and the memory cell array subblock on which the reading operation is to be performed is in a programmed state, if the other memory cell array subblock is in an erased state, a first reading voltage is applied to a selected word line layer in the memory cell array subblock on which the reading operation is to be performed, and if the other memory cell array subblock is in a programmed state, a second reading voltage is applied to a selected word line layer in the memory cell array subblock on which the reading operation is to be performed, the first reading voltage being less than the second reading voltage.

In some embodiments, the control logic is configured such that, the first reading voltage and the second reading voltage are obtained by superposition of a reference reading voltage and a compensation voltage.

In some embodiments, the control logic is configured such that, when the other memory cell array subblock is in an erased state, a reading voltage offset marker of the memory cell array block is stored as a first state, the first state representing that the compensation voltage is less than zero, and when the other memory cell array subblock is in a programmed state, the reading voltage offset marker of the memory cell array block is stored as a second state, the second state representing that the compensation voltage is zero.

In some embodiments, the memory device further comprises a register provided corresponding to the memory cell array block, the register being configured to store the corresponding reading voltage offset marker of the memory cell array block, and the control logic is configured to update the state of the register when the programmed state of any memory cell array subblock in the memory cell array block changes.

Here, said register may include a static random access memory device, etc.

In some embodiments, the memory device comprises a three-dimensional NAND-type memory.

In some embodiments, the number of storage bits of each memory cell of the multiple layers of memory cells comprises one or more bits.

In some embodiments, the number of storage bits of each memory cell comprises four bits.

Embodiments of the present disclosure further provide a memory system characterized by comprising: one or more memory devices as provided in embodiments of the present disclosure; and a memory controller, which is coupled to the one or more memory devices and controls the one or more memory devices.

Here, the memory system may refer to the memory system 102 as previously described. In some specific examples, the memory system may comprise a solid state drive or a memory card.

In some embodiments, with respect to each memory device, the corresponding control logic in each memory device is configured to send, when a corresponding operation is performed on any memory cell array subblock in a corresponding memory, the state of the memory cell array subblock to the memory controller, and the memory controller is configured to: store the state of any memory cell array subblock in each memory device, and send, before a corresponding control logic uses the subblock mode to perform a reading operation on a memory cell array block of the memory device, states of all subblocks contained in the memory cell array block to the corresponding control logic.

Here, the memory device may rely on the resources of the memory system to keep track of the reading voltage offset markers. Specifically, the memory system may store the state information of all memory cell array subblocks contained in all memory cell array blocks through registers, etc., and create the reading voltage offset markers of the corresponding memory cell array block based on the state information of all these memory cell array subblocks; upon each reading operation, before the corresponding control logic uses the subblock mode to perform a reading operation on the memory cell array block of the memory device, the memory system passes this reading voltage offset marker information to the memory device. Of course, in the scheme of tracking the reading voltage offset marker, after any memory cell array block in the memory cell array block are programmed or erased, it is also necessary to update the value of the reading voltage offset marker corresponding to the memory cell array block.

Note that the terms "first", "second", etc., are used to distinguish similar objects and need not be used to describe a particular order or sequence.

In addition, the technical solutions disclosed in the embodiments of the present disclosure can be combined with each other in any way if there are no conflicts.

The foregoing is only preferred embodiments of the present disclosure, and is not intended to limit the scope of protection of the present disclosure.

Embodiments of the present disclosure may also be as set forth in the following parentheticals.

(1) A memory device, comprising at least one memory cell array block and a control logic, wherein:
the memory cell array block comprises multiple layers of memory cells and word line layers provided corresponding to individual layers of memory cells, the memory cell array block being divided into at least two memory cell array subblocks, each memory cell array subblock comprising a number of layers of memory cells and word line layers provided corresponding to individual layers of memory cells; and
the control logic is coupled to the memory cell array block and configured to: use a block mode or a subblock mode to erase, read, or program the memory cell array block, and when using the subblock mode to erase, read, or program the memory cell array block, determine, at least based on a state of one of the two memory cell array subblocks, an operation strategy of the other memory cell array subblock.

(2) The memory device of (1), wherein the memory cell array block comprises at least: a first memory cell array subblock provided close to a semiconductor layer, and a second memory cell array subblock provided on the first memory cell array subblock.

(3) The memory device of (2), wherein the first memory cell array subblock comprises a first number of word line layers, the second memory cell array subblock comprises a second number of word line layers, and the first number is the same as or different from the second number.

(4) The memory device of (2), wherein the memory cell array block further comprises: at least one dummy memory cell layer provided between the first memory cell array subblock and the second memory cell array subblock, and corresponding at least one dummy word line layer.

(5) The memory device of (4), wherein the control logic is configured to: use, with respect to both the first memory cell array subblock and the second memory cell array subblock, a same programming sequence as that used when the block mode is adopted to perform a write programming operation on the memory cell array block.

(6) The memory device of (5), wherein the control logic is configured such that, with respect to both the first memory cell array subblock and the second memory cell array subblock, programming is performed using a reverse programming sequence, where the first memory cell array subblock is programmed sequentially from a memory cell layer closest to the at least one dummy memory cell layer to a memory cell layer closest to a bottom selection grid, and the second memory cell array subblock is programmed sequentially from a memory cell layer closest to a top selection grid to a memory cell layer closest to the at least one dummy memory cell layer.

(7) The memory device of (6), wherein the control logic is configured to determine, based on the state of one of the two memory cell array subblocks, in combination with a relative position relationship between the two memory cell array subblocks, the operation strategy of the other memory cell array subblock.

(8) The memory device of (7), wherein the control logic is configured to determine, when the first memory cell array subblock is in an erased state, that the second memory cell array subblock is capable of being used to perform a programming operation and an erasing operation.

(9) The memory device of (7), wherein the control logic is configured to determine, when the first memory cell array subblock is in a programmed state, that the second memory cell array subblock is capable of being used to perform an erasing operation and is not capable of being used to perform a programming operation.

(10) The memory device of (7), wherein the control logic is configured to determine, when the second memory cell array subblock is in an erased state or a programmed state, that the first memory cell array subblock is capable of being used to perform a programming operation and an erasing operation.

(11) The memory device of (6), wherein the control logic is configured to perform, when the first memory cell array subblock is in a programmed state and needs an erasing operation while the second memory cell array subblock is in a programmed state, an erasing operation on the first memory cell array subblock.

(12) The memory device of (11), wherein the control logic is configured to perform, when the first memory cell array subblock is in a programmed state and needs an erasing operation while data stored in the second memory cell array subblock is obsolete, an erasing operation on both the first memory cell array subblock and the second memory cell array subblock.

(13) The memory device of (6), wherein the control logic is configured such that, when the second memory cell array subblock is in a programmed state, a programming/erasing cycle count of the first memory cell array subblock is less than or equal to a first preset value.

(14) The memory device of (13), wherein the control logic is configured to prohibit, when the programming/erasing cycle count of the first memory cell array subblock is greater than the first preset value, a programming/erasing operation on the first memory cell array subblock, until the data stored in the second memory cell array subblock is erased.

(15) The memory device of (13), wherein the control logic is configured to perform, when the programming/erasing cycle count of the first memory cell array subblock is greater than the first preset value, an erasing operation and a programming operation on the data stored in the second memory cell array subblock, and subsequently the first memory cell array subblock is capable of being used to perform a programming operation and an erasing operation.
(16) The memory device of (13), wherein the first preset value is in a range of 10-100.
(17) The memory device of (2), wherein the control logic is configured to process the first memory cell array subblock and the second memory cell array subblock using a wear leveling algorithm, such that a difference between a programming/erasing cycle count of the first memory cell array subblock and a programming/erasing cycle count of the second memory cell array subblock is less than a second preset value.
(18) The memory device of (1), wherein the control logic is configured to: when using the subblock mode to perform a reading operation on the memory cell array block, determine, based on a state of each of the two memory cell array subblocks, a voltage control strategy to be used when the reading operation is performed on a memory cell array subblock in a programmed state among the two memory cell array subblocks.
(19) The memory device of (18), wherein the control logic is configured such that, when using the subblock mode to perform a reading operation on the memory cell array block, and the memory cell array subblock on which the reading operation is to be performed is in the programmed state, if the other memory cell array subblock is in an erased state, a first reading voltage is applied to a selected word line layer in the memory cell array subblock on which the reading operation is to be performed, and if the other memory cell array subblock is in a programmed state, a second reading voltage is applied to a selected word line layer in the memory cell array subblock on which the reading operation is to be performed, the first reading voltage being less than the second reading voltage.
(20) The memory device of (19), wherein the first reading voltage and the second reading voltage are obtained by superposition of a reference reading voltage and a compensation voltage.
(21) The memory device of (20), wherein the control logic is configured to: store, when the other memory cell array subblock is in an erased state, a reading voltage offset marker of the memory cell array block as a first state, the first state representing that the compensation voltage is less than zero, and store, when the other memory cell array subblock is in a programmed state, the reading voltage offset marker of the memory cell array block as a second state, the second state representing that the compensation voltage is zero.
(22) The memory device of (21), wherein the memory device further comprises a register provided corresponding to the memory cell array block, the register being configured to store the reading voltage offset marker corresponding to the memory cell array block, and the control logic is configured to update a state of the register when a programmed state of any memory cell array subblock of the memory cell array block changes.
(23) A memory system, comprising: one or more memory devices, each memory device comprising at least one memory cell array block and a control logic; and a memory controller that is coupled to and controls the one or more memory devices, wherein the memory cell array block comprises multiple layers of memory cells and word line layers provided corresponding to individual layers of memory cells, the memory cell array block being divided into at least two memory cell array subblocks, each memory cell array subblock comprising a number of layers of memory cells and word line layers provided corresponding to individual layers of memory cells, and the control logic is coupled to the memory cell array block and configured to: use a block mode or a subblock mode to erase, read, or program the memory cell array block, and when using the subblock mode to erase, read, or program the memory cell array block, determine, at least based on a state of one of the two memory cell array subblocks, an operation strategy of the other memory cell array subblock.
(24) The memory system of (23), wherein with respect to each memory device, a corresponding control logic in each memory device is configured to send, when a corresponding operation is performed on any memory cell array subblock in a corresponding memory, a state of the memory cell array subblock to the memory controller, and the memory controller is configured to store a state of any memory cell array subblock in each memory device, and send, before a corresponding control logic uses the subblock mode to perform a reading operation on a memory cell array block of the memory device, states of all subblocks included in the memory cell array block to the corresponding control logic.
(25) A method of operating a memory device, the memory device comprising at least one memory cell array block and a control logic, the memory cell array block comprising multiple layers of memory cells and word line layers provided corresponding to individual layers of memory cells, the memory cell array block being divided into at least two memory cell array subblocks, each memory cell array subblock comprising a number of layers of memory cells and word line layers provided corresponding to individual layers of memory cells, the method comprising: using a block mode or a subblock mode to perform an erasing, reading, or programming operation on the memory cell array block, and when using the subblock mode to perform the erasing, reading, or programming operation on the memory cell array block, determining, at least based on a state of one of the two memory cell array subblocks, an operation strategy of the other memory cell array subblock.
(26) The method of operating a memory device of (25), wherein the memory cell array block comprises at least: a first memory cell array subblock provided close to a semiconductor layer, and a second memory cell array subblock provided on the first memory cell array subblock.
(27) The method of operating a memory device of (26), wherein the memory cell array block further comprises: at least one dummy memory cell layer provided between the first memory cell array subblock and the second memory cell array subblock, and corresponding at least one dummy word line layer.
(28) The method of operating a memory device of (27), further comprising: using, with respect to both the first memory cell array subblock and the second memory cell array subblock, a same programming sequence as that used when the block mode is adopted to perform a write programming operation on the memory cell array block.
(29) The method of operating a memory device of (28), wherein said using, with respect to both the first memory cell array subblock and the second memory cell array subblock, a same programming sequence as that used when the block mode is adopted to perform a write programming operation on the memory cell array block comprises: using a reverse programming sequence to program both the first memory cell array subblock and the second memory cell array subblock, wherein the first memory cell array subblock is programmed sequentially from a memory cell layer closest to the at least one dummy memory cell layer to a memory cell layer closest to a bottom selection grid, and the second memory cell array subblock is programmed sequentially from a memory cell layer closest to a top selection grid to a memory cell layer closest to the at least one dummy memory cell layer.

(30) The method of operating a memory device of (25), wherein said determining, at least based on a state of one of the two memory cell array subblocks, an operation strategy of the other memory cell array subblock comprises: determining, based on the state of one of the two memory cell array subblocks, in combination with a relative position relationship between the two memory cell array subblocks, the operation strategy of the other memory cell array subblock.

(31) The method of operating a memory device of (30), wherein said determining, based on the state of one of the two memory cell array subblocks, in combination with a relative position relationship between the two memory cell array subblocks, the operation strategy of the other memory cell array subblock comprises: determining, when the first memory cell array subblock is in an erased state, that the second memory cell array subblock is capable of being used to perform a programming operation and an erasing operation.

(32) The method of operating a memory device of (30), wherein said determining, based on the state of one of the two memory cell array subblocks, in combination with a relative position relationship between the two memory cell array subblocks, the operation strategy of the other memory cell array subblock comprises: determining, when the first memory cell array subblock is in a programmed state, that the second memory cell array subblock is capable of being used to perform an erasing operation and is not capable of being used to perform a programming operation.

(33) The method of operating a memory device of (30), wherein said determining, based on the state of one of the two memory cell array subblocks, in combination with a relative position relationship between the two memory cell array subblocks, the operation strategy of the other memory cell array subblock comprises: determining, when the second memory cell array subblock is in an erased state or a programmed state, that the first memory cell array subblock is capable of being used to perform both a programming operation and an erasing operation.

(34) The method of operating a memory device of (29), further comprising: performing, when the first memory cell array subblock is in a programmed state and needs an erasing operation, while the second memory cell array subblock is in a programmed state, an erasing operation on the first memory cell array subblock.

(35) The method of operating a memory device of (34), wherein said determining, based on the state of one of the two memory cell array subblocks, in combination with a relative position relationship between the two memory cell array subblocks, the operation strategy of the other memory cell array subblock, comprises: performing, when the first memory cell array subblock is in a programmed state and needs an erasing operation, while data stored in the second memory cell array subblock is obsolete, an erasing operation on both the first memory cell array subblock and the second memory cell array subblock.

(36) The method of operating a memory device of (29), wherein when the second memory cell array subblock is in a programmed state, a programming/erasing cycle count of the first memory cell array subblock is less than or equal to a first preset value.

(37) The method of operating a memory device of (36), further comprising: prohibiting, when the programming/erasing cycle count of the first memory cell array subblock is greater than the first preset value, a programming/erasing operation on the first memory cell array subblock, until the data stored in the second memory cell array subblock is erased.

(38) The method of operating a memory device of (36), further comprising: performing, when the programming/erasing cycle count of the first memory cell array subblock is greater than the first preset value, an erasing operation and a programming operation on the data stored in the second memory cell array subblock, and subsequently the first memory cell array subblock is capable of being used to perform a programming operation and an erasing operation.

(39) The method of operating a memory device of (26), further comprising: using a wear leveling algorithm to process the first memory cell array subblock and the second memory cell array subblock, such that a difference between a programming/erasing cycle count of the first memory cell array subblock and a programming/erasing cycle count of the second memory cell array subblock is less than a second preset value.

(40) The method of operating a memory device of (25), wherein said when using the subblock mode to perform an erasing, reading, or programming operation on the memory cell array block, determining, at least based on a state of one of the two memory cell array subblocks, an operation strategy of the other memory cell array subblock, comprises: when using the subblock mode to perform a reading operation on the memory cell array block, determining, based on a state of each of the two memory cell array subblocks, a voltage control strategy to be used when the reading operation is performed on a memory cell array subblock in the programmed state among the two memory cell array subblocks.

(41) The method of operating a memory device of (40), wherein said determining, based on a state of each of the two memory cell array subblocks, a voltage control strategy to be used when a reading operation is performed on a memory cell array subblock in a programmed state among the two memory cell array subblocks, comprises: when the subblock mode is used to perform a reading operation on the memory cell array block, and the memory cell array subblock on which the reading operation is to be performed is in the programmed state, if the other memory cell array subblock is in a erased state, applying a first reading voltage to a selected word line layer in the memory cell array subblock on which the reading operation is to be performed, and if the other memory cell array subblock is in a programmed state, applying a second reading voltage to a selected word line layer in the memory cell array subblock on which the reading operation is to be performed, the first reading voltage being less than the second reading voltage.

(42) The method of operating a memory device of (41), wherein the first reading voltage and the second reading voltage are obtained by superposition of a reference reading voltage and a compensation voltage.

(43) The method of operating a memory device of (42), further comprising: storing, when the other memory cell array subblock is in an erased state, a reading voltage offset marker of the memory cell array block as a first state representing that the compensation voltage is less than zero, and storing, when the other memory cell array subblock is in a programmed state, the reading voltage offset marker of the memory cell array block as a second state representing that the compensation voltage is zero.

(44) The method of operating a memory device of (42), further comprising: updating, when a programmed state of any memory cell array subblock of the memory cell array block changes, a corresponding reading voltage offset marker of the memory cell array block.

What is claimed is:

1. A memory device, comprising at least one memory cell array block and a control logic, wherein:
    the memory cell array block comprises multiple layers of memory cells and word line layers provided corresponding to individual layers of memory cells, the memory cell array block being divided into at least two memory cell array subblocks, each memory cell array subblock comprising a number of layers of memory cells and word line layers provided corresponding to individual layers of memory cells;
    the control logic is coupled to the memory cell array block and configured to:
        use a block mode or a subblock mode to erase, read, or program the memory cell array block,
        when using the subblock mode to erase or program one memory cell array subblock of the at least two memory cell array subblocks, determine an operation restriction on an erasing or programming operation of the memory cell array subblock of the at least two memory cell array subblocks, based on states of other memory cell array subblocks of the at least two memory cell array subblocks, and a relative position relationship of the at least two memory cell array subblocks with respect to a semiconductor layer positioned at a bottom of the memory cell array block, and
        when using the subblock mode to read one memory cell array subblock of the at least two memory cell array subblocks, determine a voltage control strategy of the memory cell array subblock of the at least two memory cell array subblocks, based on states of other memory cell array subblocks of the at least two memory cell array subblocks, and a relative position relationship of the at least two memory cell array subblocks with respect to a semiconductor layer positioned at a bottom of the memory cell array block.

2. The memory device of claim 1, wherein the memory cell array block comprises: a first memory cell array subblock provided close to the semiconductor layer, and a second memory cell array subblock provided on the first memory cell array subblock.

3. The memory device of claim 2, wherein the first memory cell array subblock comprises a first number of word line layers, the second memory cell array subblock comprises a second number of word line layers, and the first number is the same as or different from the second number.

4. The memory device of claim 2, wherein the memory cell array block further comprises: at least one dummy memory cell layer provided between the first memory cell array subblock and the second memory cell array subblock, and corresponding at least one dummy word line layer.

5. The memory device of claim 4, wherein the control logic is configured to:
    use, with respect to both the first memory cell array subblock and the second memory cell array subblock, a same programming sequence as that used when the block mode is adopted to perform a write programming operation on the memory cell array block.

6. The memory device of claim 5, wherein the control logic is configured such that, with respect to both the first memory cell array subblock and the second memory cell array subblock, programming is performed using a reverse programming sequence, where the first memory cell array subblock is programmed sequentially from a memory cell layer closest to the at least one dummy memory cell layer to a memory cell layer closest to a bottom selection grid, and the second memory cell array subblock is programmed sequentially from a memory cell layer closest to a top selection grid to a memory cell layer closest to the at least one dummy memory cell layer.

7. The memory device of claim 6, wherein the control logic is configured to determine, based on the state of one of the two memory cell array subblocks, in combination with a relative position relationship between the two memory cell array subblocks, the operation strategy of the other memory cell array subblock.

8. The memory device of claim 7, wherein the control logic is configured to determine, when the first memory cell array subblock is in an erased state, that the second memory cell array subblock is capable of being used to perform a programming operation and an erasing operation.

9. The memory device of claim 7, wherein the control logic is configured to determine, when the first memory cell array subblock is in a programmed state, that the second memory cell array subblock is capable of being used to perform an erasing operation and is not capable of being used to perform a programming operation.

10. The memory device of claim 7, wherein the control logic is configured to determine, when the second memory cell array subblock is in an erased state or a programmed state, that the first memory cell array subblock is capable of being used to perform a programming operation and an erasing operation.

11. The memory device of claim 6, wherein the control logic is configured to perform, when the first memory cell array subblock is in a programmed state and needs an erasing operation while the second memory cell array subblock is in a programmed state, an erasing operation on the first memory cell array subblock.

12. The memory device of claim 11, wherein the control logic is configured to perform, when the first memory cell array subblock is in a programmed state and needs an erasing operation while data stored in the second memory cell array subblock is obsolete, an erasing operation on both the first memory cell array subblock and the second memory cell array subblock.

13. The memory device of claim 6, wherein the control logic is configured such that, when the second memory cell array subblock is in a programmed state, a programming/ erasing cycle count of the first memory cell array subblock is less than or equal to a first preset value.

14. The memory device of claim 13, wherein the control logic is configured to prohibit, when the programming/erasing cycle count of the first memory cell array subblock is greater than the first preset value, a programming/erasing operation on the first memory cell array subblock, until the data stored in the second memory cell array subblock is erased.

15. The memory device of claim 13, wherein the control logic is configured to perform, when the programming/erasing cycle count of the first memory cell array subblock is greater than the first preset value, an erasing operation and a programming operation on the data stored in the second memory cell array subblock, and subsequently the first memory cell array subblock is capable of being used to perform a programming operation and an erasing operation.

16. The memory device of claim 2, wherein the control logic is configured to process the first memory cell array subblock and the second memory cell array subblock using a wear leveling algorithm, such that a difference between a programming/erasing cycle count of the first memory cell array subblock and a programming/erasing cycle count of the second memory cell array subblock is less than a second preset value.

17. The memory device of claim 1, wherein the control logic is configured to: when using the subblock mode to perform a reading operation on the memory cell array block, determine, based on a state of each of the two memory cell array subblocks, a voltage control strategy to be used when the reading operation is performed on a memory cell array subblock in a programmed state among the two memory cell array subblocks.

18. The memory device of claim 17, wherein the control logic is configured such that, when using the subblock mode to perform a reading operation on the memory cell array block, and the memory cell array subblock on which the reading operation is to be performed is in the programmed state, if the other memory cell array subblock is in an erased state, a first reading voltage is applied to a selected word line layer in the memory cell array subblock on which the reading operation is to be performed, and if the other memory cell array subblock is in a programmed state, a second reading voltage is applied to a selected word line layer in the memory cell array subblock on which the reading operation is to be performed, the first reading voltage being less than the second reading voltage.

19. A memory system, comprising:
one or more memory devices, each memory device comprising at least one memory cell array block and a control logic; and
a memory controller that is coupled to and controls the one or more memory devices, wherein
the memory cell array block comprises multiple layers of memory cells and word line layers provided corresponding to individual layers of memory cells, the memory cell array block being divided into at least two memory cell array subblocks, each memory cell array subblock comprising a number of layers of memory cells and word line layers provided corresponding to individual layers of memory cells, and
the control logic is coupled to the memory cell array block and configured to:
use a block mode or a subblock mode to erase, read, or program the memory cell array block,
when using the subblock mode to erase or program one memory cell array subblock of the at least two memory cell array subblocks, determine an operation restriction on an erasing or programming operation of the memory cell array subblock of the at least two memory cell array subblocks, based on states of other memory cell array subblocks of the at least two memory cell array subblocks, and a relative position relationship of the at least two memory cell array subblocks with respect to a semiconductor layer positioned at a bottom of the memory cell array block, and
when using the subblock mode to read one memory cell array subblock of the at least two memory cell array subblocks, determine a voltage control strategy of the memory cell array subblock of the at least two memory cell array subblocks, based on states of other memory cell array subblocks of the at least two memory cell array subblocks, and a relative position relationship of the at least two memory cell array subblocks with respect to a semiconductor layer positioned at a bottom of the memory cell array block.

20. A method of operating a memory device, the memory device comprising at least one memory cell array block and a control logic, the memory cell array block comprising multiple layers of memory cells and word line layers provided corresponding to individual layers of memory cells, the memory cell array block being divided into at least two memory cell array subblocks, each memory cell array subblock comprising a number of layers of memory cells and word line layers provided corresponding to individual layers of memory cells, the method comprising:
using a block mode or a subblock mode to perform an erasing, reading, or programming operation on the memory cell array block,
when using the subblock mode to perform the erasing or programming operation on one memory cell array subblock of the at least two memory cell array subblocks, determining an operation restriction on the memory cell array subblock of the at least two memory cell array subblocks, based on states of other memory cell array subblocks of the at least two memory cell array subblocks, and a relative position relationship of the at least two memory cell array subblocks with respect to a semiconductor layer positioned at a bottom of the memory cell array block, and
when using the subblock mode to perform the reading operation on one memory cell array subblock of the at least two memory cell array subblocks, determining a voltage control strategy of the memory cell array subblock of the at least two memory cell array subblocks, based on states of other memory cell array subblocks of the at least two memory cell array subblocks, and a relative position relationship of the at least two memory cell array subblocks with respect to a semiconductor layer positioned at a bottom of the memory cell array block.

* * * * *